United States Patent
Wu

(10) Patent No.: US 9,883,078 B2
(45) Date of Patent: Jan. 30, 2018

(54) SYSTEMS AND METHODS FOR EFFICIENT HALFTONE WHERE DIFFERENT DITHERING MATRICES ARE COMBINED

(71) Applicant: CANON KABUSHIKI KAISHA, Tokyo (JP)

(72) Inventor: Sheng Wu, Chatswood (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/157,154

(22) Filed: May 17, 2016

(65) Prior Publication Data

US 2016/0344900 A1    Nov. 24, 2016

(30) Foreign Application Priority Data

May 18, 2015    (AU) ................................ 2015202676

(51) Int. Cl.
*H04N 1/52* (2006.01)
*H04N 1/405* (2006.01)
*H04N 1/60* (2006.01)

(52) U.S. Cl.
CPC ............. *H04N 1/52* (2013.01); *H04N 1/405* (2013.01); *H04N 1/6008* (2013.01)

(58) Field of Classification Search
CPC ......... H04N 1/52; H04N 1/405; H04N 1/6008
See application file for complete search history.

(56) References Cited

U.S. PATENT DOCUMENTS

| | | | |
|---|---|---|---|
| 7,199,897 B2 | 4/2007 | Nomizu | |
| 8,270,031 B2 | 9/2012 | Mitchell | |
| 2005/0030586 A1 | 2/2005 | Huang | |
| 2010/0079811 A1* | 4/2010 | Ota | H04N 1/4056 358/3.06 |
| 2011/0317174 A1 | 12/2011 | Shimahashi | |
| 2015/0092244 A1* | 4/2015 | Yamada | H04N 1/4092 358/3.15 |

OTHER PUBLICATIONS

Leo J. Van Bokhoven, "Real-time color image processing on a VLIM image processor."; id. nr. 383673; Sep. 1, 1998, 84 pages, Eindhoven University of Technology.

* cited by examiner

*Primary Examiner* — Christopher D Wait

(74) *Attorney, Agent, or Firm* — Canon U.S.A., Inc. IP Division

(57) ABSTRACT

A graphics processing method receives a plurality of contiguous pixels, as a single input, including at least a first pixel span associated with a first content type and a second pixel span associated with a second content type. At least one dithering matrix is associated with each of the pixel spans based on the corresponding content type, so that the first and the second pixel spans are associated with different dithering matrices. The single input of the received plurality of pixels is then concurrently processed using an SIMD (Single Instruction Multiple Data) type processor by referring to different dithering matrices depending on the content type of the corresponding pixel spans.

21 Claims, 14 Drawing Sheets

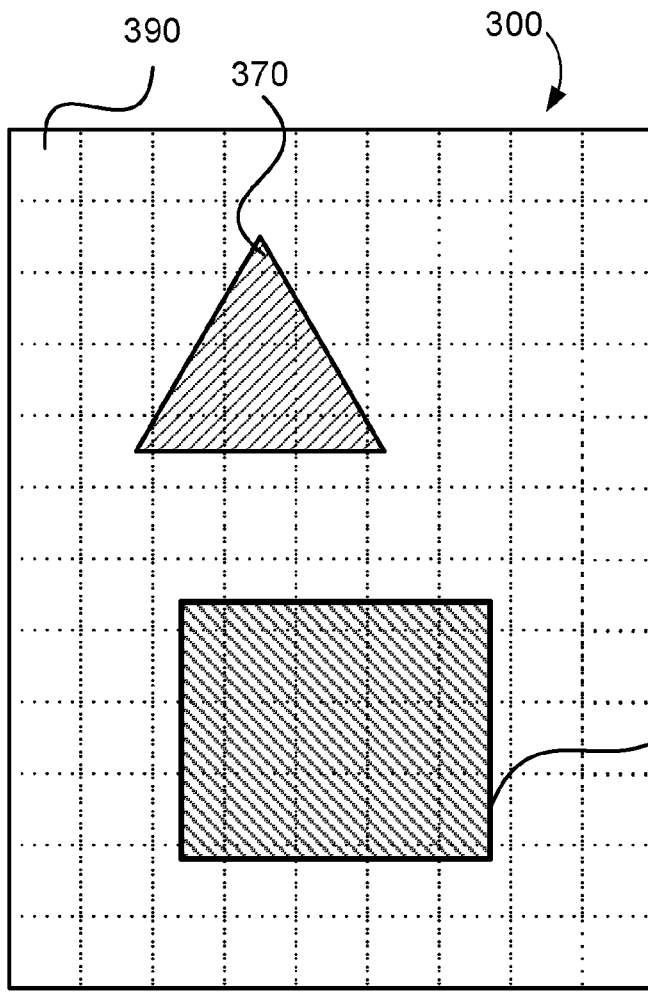
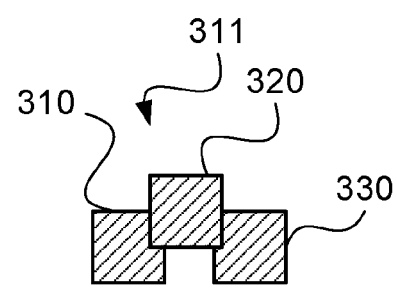
Fig. 3B
Fig. 3A
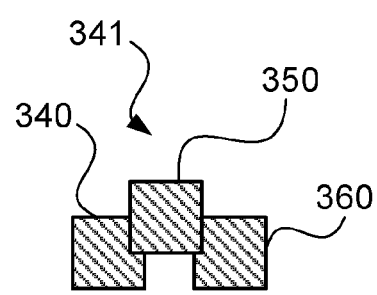
Fig. 3C

SYSTEMS AND METHODS FOR EFFICIENT HALFTONE WHERE DIFFERENT DITHERING MATRICES ARE COMBINED

REFERENCE TO RELATED PATENT APPLICATION(S)

This application claims the benefit under 35 U.S.C. §119 of the filing date of Australian Patent Application No. 2015202676, filed May 18, 2015, hereby incorporated by reference in its entirety as if fully set forth herein.

TECHNICAL FIELD

The present invention relates in general to printing systems, and more specifically to printing systems that use SIMD (Single Instruction Multiple Data) for halftoning. Specifically disclosed are graphics processing methods and systems that perform dithering using SIMD in printing environments.

BACKGROUND

The printing process in modern computing systems typically involves receiving a high-level description of a page to be printed in the form of a page description language (e.g., PDF (originally developed by Adobe Systems Incorporated) or XML Paper Specification (XPS)), converting the page description into pixels by a rendering engine, and sending the pixels to a printer, which prints the rendered pixels on paper.

The rendering engine renders pixels into continuous tone (contone) colour channels, which is generally at a resolution of at least 8 bits per channel A CMYK colour printer uses three different types of toner, cyan (C), magenta (M) and yellow (Y) to create colourful images. An extra channel, black (K), can be used to print fully black pixels (e.g., for a text content type) and to create very dark colours. Traditionally printing devices can only realise 1 bit of colour depth per channel: for each colour channel the printing device either does or does not transfer toner to the paper. Modern printing devices can realise more than 1 bit per channel, by having dots varying in size, shape or spacing, thus representing pixels of, for example, 2 bits or 4 bits per channel. The process of converting the page pixels in contone colour channels received from the rendering engine into halftone colour channels that the printing engine can reproduce is called halftoning.

Dithering is a typical halftoning process in which dithering matrices representing certain patterns are applied onto the contone pixels of a halftone cell to generate a gradient-like effect that simulates the contone image. In this document the terms halftoning and dithering are used interchangeably.

Halftoning can be very consuming of computing resources. There are conventional methods to improve halftoning performance. When halftoning for 1-bit-per-channel printing devices, an SIMD (Single Instruction Multiple Data) processor is often used to process multiple pixels in the time taken to execute one instruction. It is simple to apply a single dithering matrix to halftone a sequence of pixels. Thus the use of SIMD dramatically improves performance for 1-bit-per-channel halftoning. However, it is more difficult to utilize SIMD operations when performing 2-bit or 4-bit dithering, because different dither matrices need to be applied to different pixels to generate the second and subsequent bits. Moreover, different types of content on the page are often dithered using different sets of patterns. A pixel run is traditionally considered as a sequence of contiguous pixels along a scan line. A pixel run can contain multiple types of pixels that require more than one set of dithering matrices. Generally each type of pixel in a pixel run is associated with a pixel span, being a group of contiguous pixels defined between two delimiting graphical conditions, such as two object edges. Some pixel spans, for example, may be formed of bitmap pixels (where the relevant object references a bitmap image), others may be solid colours, whereas others may be blends, composites, gradients, or combinations of these. When processing a pixel run, it is not efficient to halftone just a few pixels a time, which is less than the capacity of a typical SIMD type register, instead of a run of several pixels matching the capacity of the SIMD type register. Modern SIMD instruction sets, like the Advanced Vector Extensions (AVX) on x86 architecture microprocessors from Intel Corp. can process 512 bits at one time. However, the longer the run of pixels, the more likely it is to have pixels of different types requiring different dither matrices to be used in halftoning the pixel run. A method that can better utilize SIMD operations in this situation will get the benefit of a faster halftoning speed.

SUMMARY

According to one aspect of the present disclosure there is provided a graphics processing method including:

receiving a plurality of contiguous pixels, as a single input, including at least a first pixel span associated with a first content type and a second pixel span associated with a second content type;

associating at least one dithering matrix with each of the pixel spans based on a corresponding content type, so that the first and the second pixel spans are associated with different dithering matrices; and concurrently processing the single input of the received plurality of pixels using an SIMD type processor by referring to different dithering matrices depending on the content type of the corresponding pixel spans.

Typically a pixel of the first pixel span and a pixel of the second pixel span are concurrently processed using elements of different dithering matrices depending on the content type of the corresponding pixel spans.

According to another aspect, there is disclosed a dithering method including:

receiving, as a single input, a plurality of pixels including a first pixel span associated with a first content type and a second pixel span associated with a second content type;

determining, for each pixel span, at least one associated dithering matrix based on a corresponding content type of the pixel span, so that the first and the second pixel spans are associated with different dithering matrices; and concurrently dithering the received plurality of pixels by executing a single SIMD instruction with respect to the received plurality of pixels, wherein dithering comprises processing, on an SIMD type processor, the first and second pixel spans by elements of different dithering matrices depending on the corresponding content type.

According to another aspect, there is disclosed a dithering method including:

receiving a pixel run having a plurality of pixels associated with a plurality of distinct content types, the pixel run including a plurality of pixel spans each associated with one of the content types;

determining a dithering mode based on the plurality of distinct content types identified for the pixel spans within the received pixel run;

associating, for each pixel span, at least one dithering matrix based on a corresponding content type; and concurrently dithering the received plurality of pixel spans in accordance with the determined dithering mode by executing an SIMD instruction on an SIMD type processor, the SIMD instruction operating concurrently on the plurality of pixel spans, taken as a single input, in accordance with different dithering matrices depending on the content type of the corresponding pixel span.

Preferably the determining of the dithering mode is further based on at least one of the length of the pixel run, the number of pixel spans in the run and a number of bits per pixel of dithered output.

Generally the content type is at least one of: image, text, and graphics.

The method may further comprise associating, for each span of a particular content type, at least two dithering matrices, each of the dithering matrices being used to produce a one bit of a multi-bit output for a received element. Preferably the executing of the single instruction further comprises, for each span of a particular content type, using the dithering matrix associated with the particular content type of the corresponding pixel span to produce a first bit of a multi-bit output, and using a further dithering matrix to produce a further bit of the multi-bit output, the further dithering matrix being selected based on the produced first bit and the content type of the corresponding pixel span.

The method may further combine, based on a selected dithering mode, the different dithering matrices to be used by the single instruction.

In another example the method further comprises applying different dithering matrices to the pixel spans and combining results thereof to form a dithered pixel run.

In a specific implementation the dithering mode is determined based on a number of distinct content types detected in the received plurality of elements, lengths of the pixel run and a number of bits per pixel in the multi-bit output.

In a further example a first dithering mode comprises:

combining the different dithering matrices into a combined data structure by selecting elements of the matrices depending on arrangement of the pixel runs;

using the combined data structure to produce the output for the received plurality of elements.

In another example a first dithering mode comprises:

concurrently merging elements of the different dithering matrices into a dithering mask by selecting elements from the different matrices depending on the content type of corresponding pixels in the pixel run; and using the dithering mask to produce the output for the received plurality of pixels.

In another implementation a second dithering mode comprises:

producing a single intermediate output for each detected content type using a corresponding dithering matrix; and combining the intermediate outputs to produce an output for the received plurality of elements.

In a further implementation a second dithering mode comprises:

producing an intermediate output for each detected content type using a corresponding dithering matrix; and concurrently merging the intermediate outputs by selecting pixels from different intermediate outputs depending on the content type of corresponding pixels in the pixel run to produce an output for the received plurality of pixels.

Other aspects, implementations and configurations are also disclosed. Such include printers adapted for dithering and software drivers for printing.

BRIEF DESCRIPTION OF THE DRAWINGS

At least one embodiment of the invention will now be described with reference to the following drawings, in which:

FIGS. 3A-3C illustrate a page of pixels and the dithering matrices to be applied;

DETAILED DESCRIPTION INCLUDING BEST MODE

Context

Figure 2:
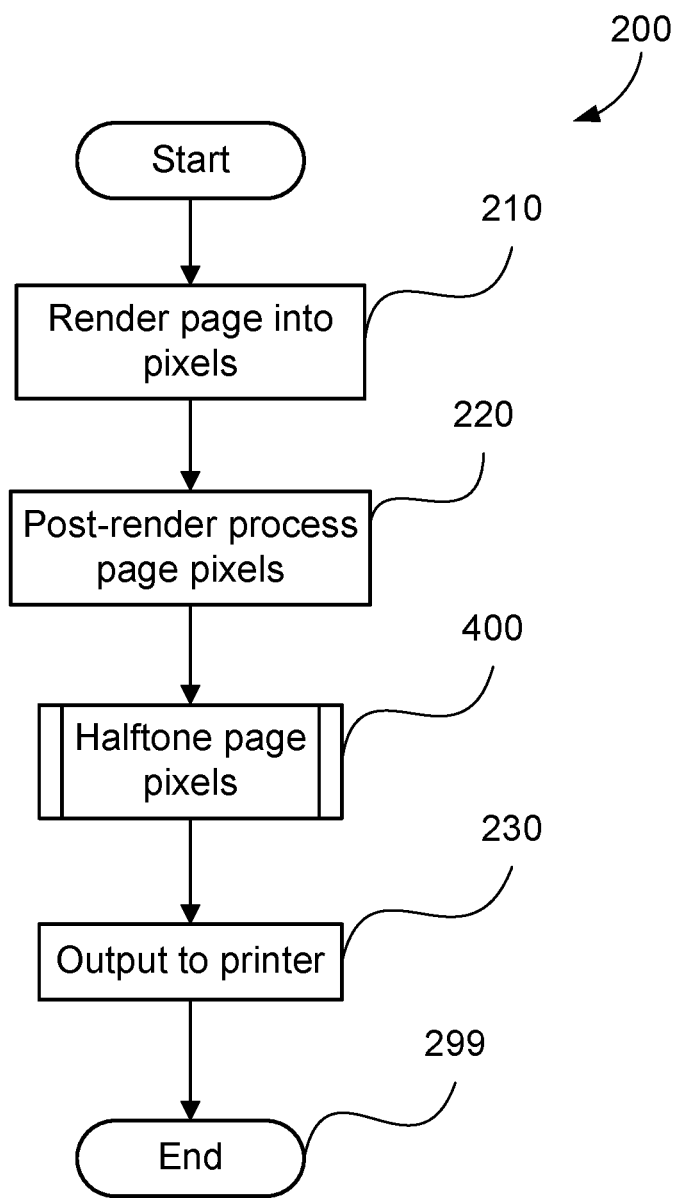
FIG. 2 is a schematic block diagram showing the flow of a method of rendering a page and generating output on a printer.

FIG. 2 illustrates the general flow of the printing process 200 as typically used in a printing system and within which the arrangements presently described are implemented. At step 210, a rendering engine renders the description of a page previously presented in a high-level page description language into pixels consisting of contone colour channels. The rendering engine also generates a page of attribute data for the page; each attribute value contains information for a corresponding pixel on the page, indicating the object type of the pixel and other information. The common graphical object types on a rendered page include small text, big text, graphics, image, blank background, etc., each representing a distinct content type that may be identified within an individual pixel run. This attribute information is useful for post-render procedures like colour conversion and halftoning, where different algorithms or optimizations can be applied depending on the object type of each pixel. For example, the system might want to use a specific complicated colour space for image colour conversion for better quality reproduction of bitmap images, while use a simple colour space for text and graphics colour conversion for better performance. At step 220, a post-render procedure is typically applied to the rendered page pixels. This can include colour conversion from a contone render colour space (such as RGB (having red, green and blue colour channels)) into a contone output colour space, usually CMYK. In a following procedure 400, the contone page pixels of at least 8 bits per colour channel are dithered into multi-bit halftone pixels of preferably 2 bits or 4 bits per colour channel, during the post-render process to generate a gradient-like effect that simulates the contone page. At step 230, the halftoned page pixels are sent to the printing engine to be printed on a paper.

Subject to the specific implementation, certain parts of the process 200 may be performed in a computing device to which a printer device connects, and other parts may be performed in the printer device. For example, where the printer device is a relatively low-cost device, all of the steps of the process 200 may be performed by a printer driver within the computing device (such as a personal computer), with the printer device simply receiving halftoned bitmap data for reproduction to a medium such as paper. In this case, the driver makes use of SIMD capabilities of the host to perform the features and operations described herein. Where the printer device has greater computational capacity, some steps, such as steps 400 and 230 may be performed within the printer device. In such cases, step 230, being "output to printer" can be the forwarding of halftoned print data to a print engine of the printer. Where the printer device is relatively high-end and has significant computational capability, including SIMD capability, step 400 performed by the print device can perform the presently described arrangements. In some high-end print devices, each of the steps of the process 200 may be performed within the printer, with the printer receiving page description language representations of each page to be printed from the supplying computer. This example of implementation is now structurally described with reference to FIGS. 1A and 1B.

Figure 1A:
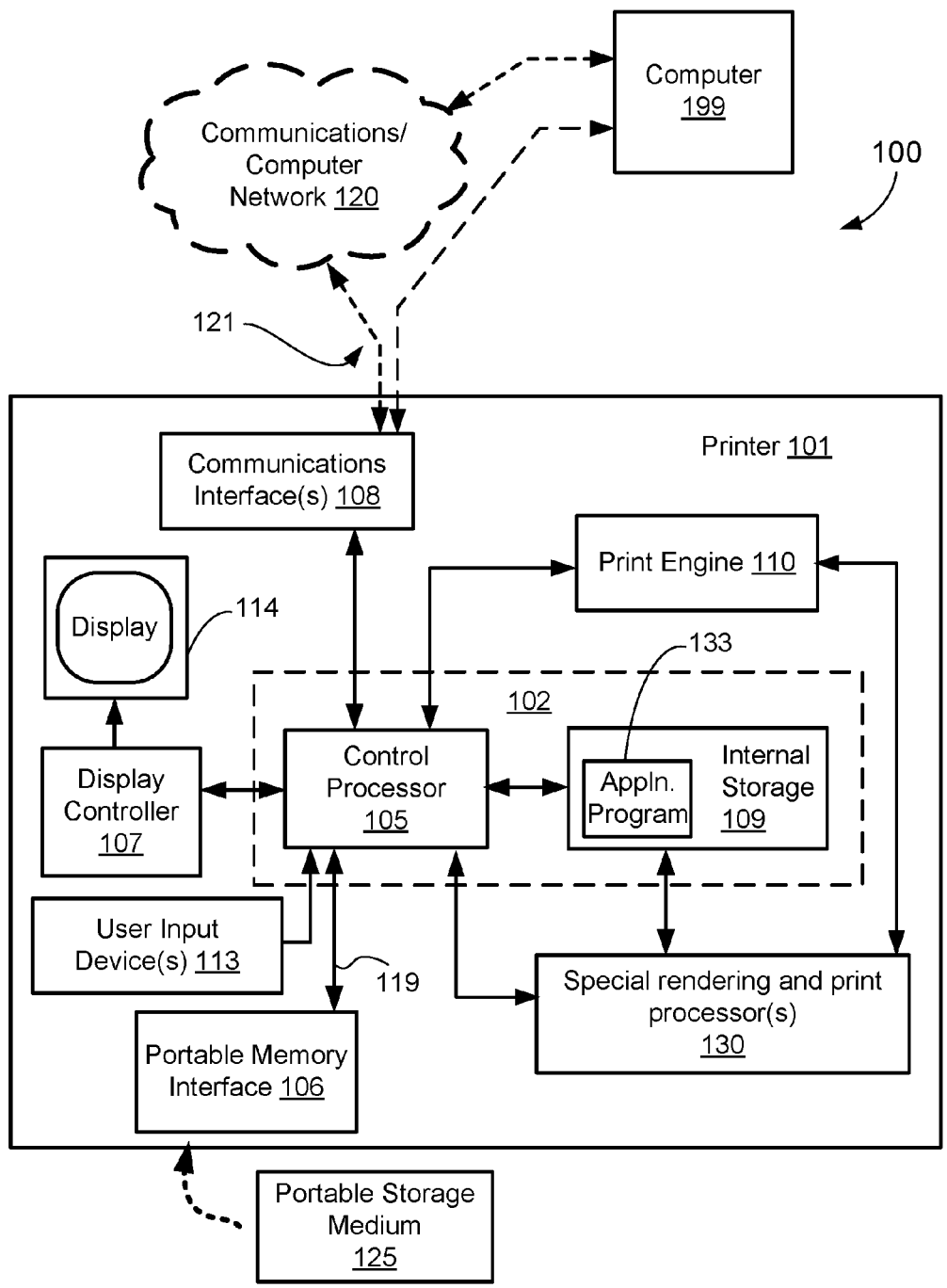
FIGS. 1A and 1B collectively form a schematic block diagram showing the architecture of a printing system.
Figure 1B:
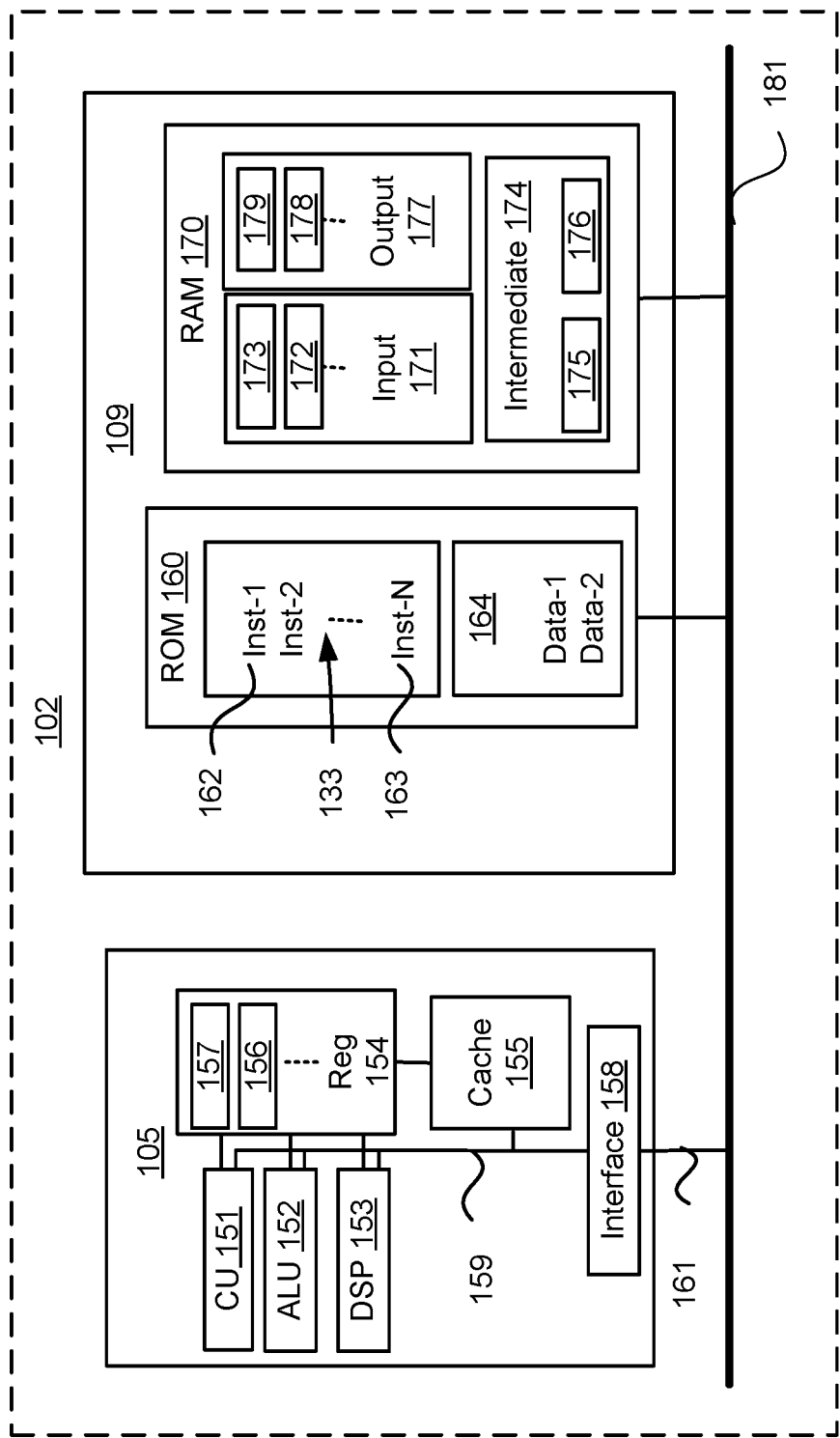

FIGS. 1A and 1B collectively form a schematic block diagram of a printer device 101 including embedded components, upon which the graphics processing and dithering methods to be described are desirably practiced. Nevertheless, the methods to be described or parts thereof may also be performed on higher-level devices such as desktop computers, server computers, and other such devices with significantly larger processing resources.

As seen in FIG. 1A, the printer device 101 comprises an embedded controller 102. In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The printer device 101 includes a display controller 107, which is connected to a display device 114, such as a liquid crystal display (LCD) panel or the like. The display controller 107 is configured for displaying graphical images on the display 114 in accordance with instructions received from the embedded controller 102, to which the display controller 107 is connected.

The printer device 101 also includes user input devices 113 which are typically formed by keys, a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the printer device 101 also comprises a portable memory interface 106, which is coupled to the processor 105 via a connection 119. The portable memory interface 106 allows a complementary portable memory device 125 to be coupled to the printer device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The printer device 101 also has a communications interface 108 to permit coupling of the device 101 to communications network 120 via a connection 121 or a computer 199. The connection 121 may be wired or wireless. For example, the connection 121 may be radio frequency or optical. An example of a wired connection includes those according to the Ethernet™ standards. Further, an example of wireless connection includes Bluetooth™ type local interconnection, Wi-Fi (including protocols based on the standards of the IEEE 802.11 family), Infrared Data Association (IrDa) and the like. The communications interface 108 permits receipt by the printer device 101 of printing data which may, for example, be a graphical page description or rendered pixels, subject to the configuration of the printer device 101 and/or the computer 199.

Typically, the printer device 101 includes a print engine 110 coupled to the embedded controller 102, and which is configured to reproduce print data, for example provided by the controller 102, onto a medium such as paper and thus representing a concrete output of the printing process 200.

Also shown in FIG. 1A, the printer device 101 may include one or more special purpose processors 130 for performing specific graphics, rendering, image or print manipulation functions. For example, where used the processor(s) 130 may perform one or more of graphics rendering, colour conversion and halftoning. As seen, the processor(s) 130 can be coupled to the control processor 102 for receipt of commands and data, and may also include a direct connection to the memory storage 109 for direct access to data and/or commands Output of the processor(s) may return intermediate data to the memory storage 109, and final print data directly to the print engine 110. In the specific implementations described herein, where only the control processor 102 is used, such may be an SIMD processor or a general purpose processor with SIMD capability. In implementations where special purpose processor(s) 130 are used such may be an SIMD processor or be general purpose processor with SIMD capability.

The methods described hereinafter may be implemented using the embedded controller 102 and/or processor(s) 130, where the processes of FIGS. 2 to 12 may typically be implemented as one or more software application programs 133 executable within the embedded controller 102 and/or processor(s) 130. In particular, with reference to FIG. 1B, the steps of the described methods can be effected by instructions in the software 133 that are carried out within the printer 101. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the printer device 101. However, in some instances, the application programs 133 may be supplied to the user encoded on one or more CD-ROM (not shown) and read via the portable memory interface 106 of FIG. 1A prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1A. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the printer device 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the printer device 101. Typically, the application program 133 waits for events and subsequently executes the block of code associated with that event. Events may be triggered in response to input from a user, via the user input devices 113 of FIG. 1A, as detected by the processor 105. Events may also be triggered in response to other sensors and interfaces in the printer device 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the printer device 101.

Where desired by a specific implementation, the processor(s) 130 may be appropriately programmed processors by which the specific process steps are performed via software. The processor(s) 130 may be general purpose CPUs that have an SIMD capability or more specifically an SIMD instruction capability.

The Dithering Procedure

FIG. 3A shows a page 300 with two objects 370 and 380 to be dithered with two sets of dithering matrices 311 and 341, seen in FIGS. 3B and 3C respectively, from a contone K (black channel) colour space to a 2-bit-per-channel K colour space. Object 370 is required to be dithered with the set 311 of dithering matrices 310, 320 and 330, seen FIG. 3B. Object 380 is required to be dithered with the set 341 of dithering matrices 340, 350 and 360, seen in FIG. 3C. For 2-bit-per-channel output dithering, each set of dithering matrices for each colour channel contains three matrices, dm0, dm1 and dm2, with the value of an element of dm0 being less than (<) the value of the corresponding element of dm1, which in turn is less than (<) the value of the corresponding element of dm2, for every colour channel in the CMYK colour space. Dither matrices 310, 320 and 330 are the dm0, dm1 and dm2 for the first set 311 of dithering matrices for the K colour channel, and matrices 340 350 and 360 are the dm0, dm1 and dm2 of the second set 341 of dithering matrices for the K colour channel, respectively. Sets of dithering matrices are typically pre-defined by printer manufacturers and are provided along with printer drivers or are embedded in printer firmware. Typical sizes include 16×16 or 24×24 pixels, but other sizes are possible. The number of pixels on a printed page depends on the size of the paper and the printing resolution. A typical page 300 can consist of 7000×5000 pixels.

To dither the pixels on the page, dithering matrices are repeatedly applied across the page 300, generally starting from the top left corner 390. Every pixel on the page corresponds to a matrix element based on this repetition. For example, for a 16×16 matrix, the first 16 pixels on each of the first 16 scan lines of the page 300 are associated with the corresponding elements in a corresponding row and column of an instance of the matrix. The following 16 pixels are similarly associated with a repeated instance of the matrix, and so on, across the page 300. Likewise, each lot of 16 pixels on the second set of 16 scan lines of the page 300 are associated with the elements of the matrix, and so on across and down the page 300. Thus each pixel of object 370 and object 380 is compared to an element of a relevant matrix according to the position of the pixel in the grid of matrices laid out on page 300.

For 2-bit-per-channel dithering, two passes comparing pixel colour channel values to matrix elements are required. In the first pass of comparison, the value of each successive pixel in each colour channel is compared to a corresponding successive dm1 element values of the dither matrix for the corresponding colour channel and object type. If the pixel colour value exceeds the value for the pixel in dm1, then the high bit of the dithered result for the colour channel is set as 1, and the value of the matrix element corresponding to the pixel in dm2 of the dithering matrix set is then compared to the pixel colour value in the second pass of comparison. Otherwise, if the pixel colour value is less than or equal to the corresponding value in dm1, then the high bit of the dithered result for the colour channel is set as 0, and the value corresponding to the pixel in dm0 of the dithering matrix set is then compared to the pixel colour value in the second pass of comparison. The low bit of the dithered result for the colour channel is determined by the result of the second comparison with either dm0 or dm2.

The halftoning process illustrated by FIG. 3 can be performed on an SIMD processor, or a general purpose processor with SIMD capability, one pixel run at a time, instead of one pixel at a time. In conventional systems, the length of the pixel run that can be processed by an SIMD type processor depends on two factors, the SIMD capability of the processor and the content of the pixel run. The SIMD capability varies with processor model. The current Intel AVX instruction set, for example, allows up to 512 bits of pixel data to be processed at the same time with each SIMD instruction. With regard to the content type, pixels originating from different types of objects often require being dithered using different sets of dithering matrices. For example, pixels of a high quality image might need to use a set of dithering matrices optimized for high resolution images (such as the "HIGH_RESOLUTION" matrix set presented later in relation to an example), while pixels of a graph might need to use a set of dithering matrices for computer graphics (such as the "TONED" matrix set presented later in relation to an example). The matrices in one set can have different size from the matrices in another set. Furthermore, matrices in different sets typically contain different values, forming different patterns to generate a gradient-like effect that simulate the contone colours. They are normally pre-defined by the printer on which the page is to be printed. Therefore, the length of a pixel run that can be processed by SIMD instructions in a conventional system is further limited by the length of a group of continuous pixels of the same object type (a pixel span) requiring the same set of dithering matrices.

Process

With a pixel run that is 512 bits long, such is quite likely to include pixels originating from different types of objects. One problem of simply applying SIMD operations onto the halftone process described above is that the pixel run needs to be broken down into pixel spans, i.e., smaller runs of pixels of the same object type, hence losing much of the advantage of SIMD operations. In some cases of SIMD operations, depending on object type, adjacent pixel spans may require the same set of dither matrices, but in many cases, different sets of dither matrices are required. To overcome this disadvantage, the presently described arrangements are able to process a group of continuous pixels requiring different sets of dithering matrices (multiple pixel spans) as a single input to an SIMD-type register. With a run of 512 pixels, such represents a group of continuous pixels typically representing multiple spans and which may be treated for processing as a single input, thereby obviating any need to divide the group into separate spans each requiring specific graphics processing.

Figure 4:
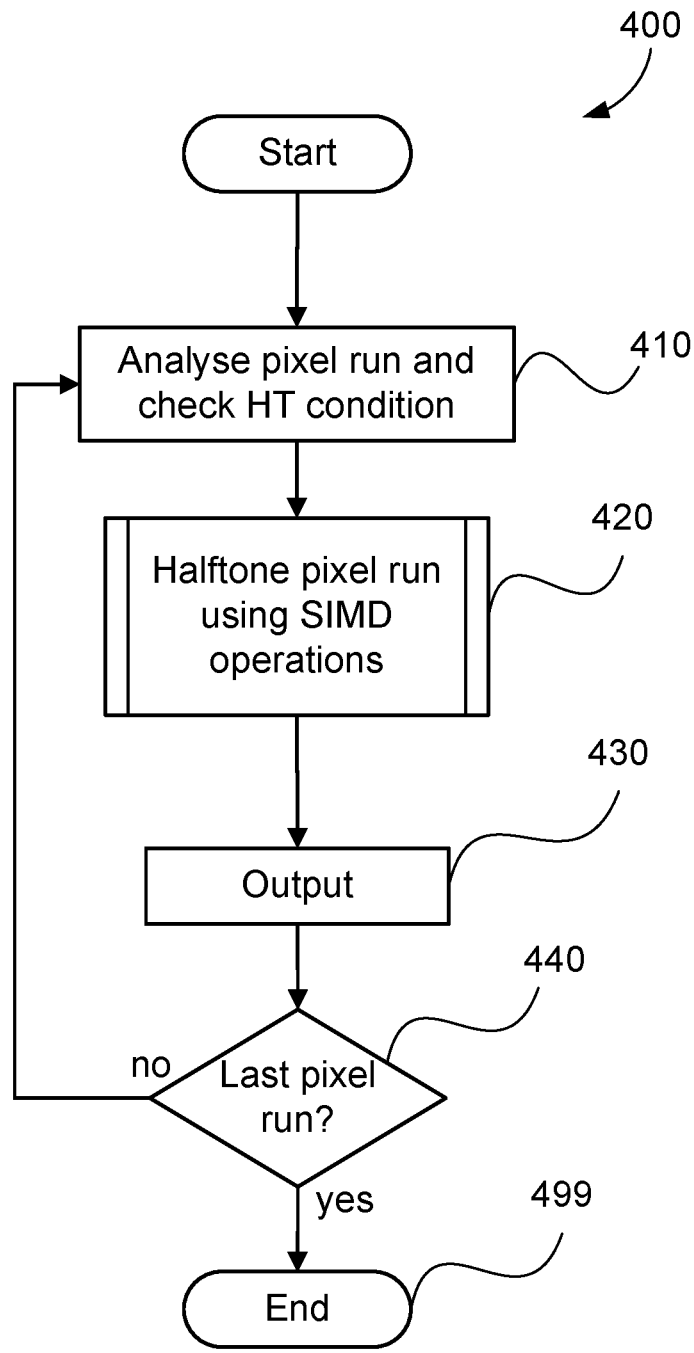
FIG. 4 is a schematic flow diagram illustrating a method of halftoning the pixels on a rendered page with SIMD instructions, as used in the method of FIG. 2.

FIG. 4 illustrates a method 400 for halftoning pixels on a rendered page with SIMD and which can be used as part of the process 200 of FIG. 2. The method 400 is preferably implemented in software executable on an SIMD-capable processor. At step 410, a halftone engine that runs on a processor with SIMD capability receives, from the renderer, a run of page pixels in contone colour channels to be dithered. The run of page pixels contains more than one type of object (content), with each identified type of object required to be dithered with a different set of dither matrices. The halftone engine also receives the corresponding attribute data of the pixel run, indicating which pixels are background, which are image, which are text, and so on. The length of the pixel run to be processed by the next step depends on the processor's SIMD implementation. For example, on an Intel x86 CPU with SSE2 (Streaming SIMD Extensions 2) support, each SIMD register can hold up to and process 128 bits of data per instruction. On an Intel x86 CPU with AVX-512 (Advanced Vector Extensions) support, each SIMD register can hold up to and process 512 bits of data per instruction. At step 410, the halftone engine analyses the received pixel content and the attribute data to determine the complexity of the pixel run. The analysis includes, but is not limited to, identification of and calculating the total number of different types of objects/content, and checking the number of bits per colour channel of the output. Based on the analysis, at step 420, the halftone engine selects an optimized procedure (dithering mode) and then halftones, in accordance with the selected procedure, the pixel run as a single input using SIMD operations without breaking the pixel run into individual pixel spans. This involves selecting the appropriate, and thereby different, dithering matrices for different pixels depending on the object type as indicated by the attribute data and concurrently processing the pixels of the pixel run on an SIMD type processor, by executing at least one SIMD instruction, using the different dithering matrices. At step 430, the halftoned page pixels are output sent to the output engine, such as the print engine 110, for hard-copy reproduction. At step 440, the halftone engine checks if this is the last pixel run of the page pixels to be processed. If not, the process 400 returns to step 410 where the halftone engine receives the next pixel run of page pixels and the corresponding attribute data. Otherwise the halftone engine finishes processing the page pixels at step 499.

Two methods for performing the halftoning on a pixel run with different types of objects without breaking the pixel run into individual pixel spans are described below.

The first halftoning method (dithering mode) involves selecting matrix elements from matrices of different matrix sets based on the object type of each pixel and constructing a combined or merged set of elements. The merged set of elements is applied to the pixels in the run such that each pixel is dithered based on its corresponding type. For example, for pixels that contain text (i.e., their object type is text), elements of text dithering matrices are chosen and applied to those pixels.

The second halftoning method (dithering mode) involves dithering the whole pixel run with each set of matrices in turn, and merging the results based on the object type of each pixel. This will be discussed in detail below.

Selection between the two halftoning methods (dithering modes) is made in step 420 on the basis of the analysis carried out in step 410 of FIG. 4. In particular, it is preferable to use the first dithering method when the output has no more than two bits per colour channel and the number of sets of matrices required to dither the run is below or equal to a first predefined threshold. In this case, the first predefined threshold can be set to two sets of matrices. The number of sets of matrices required equals the distinct number of object types requiring different dither matrices that occur in the pixels of the run. This can be determined by examining the attribute data. In the case where the output has more than two bits per channel and the number of sets of matrices required is over the threshold, then the second dithering method is preferable.

In the remaining cases, i.e., when the output has more than two bits per channel but the number of sets of matrices required is below the threshold, or when the output has two bits per channel but the number of sets of matrices required is over the first threshold, then either method can be used, or the faster method can be predetermined by other means such as experimentation. Note that either method used individually (without an analysis step) is more efficient than conventional approaches discussed above and may be used individually as an alternative implementation.

Figure 5:
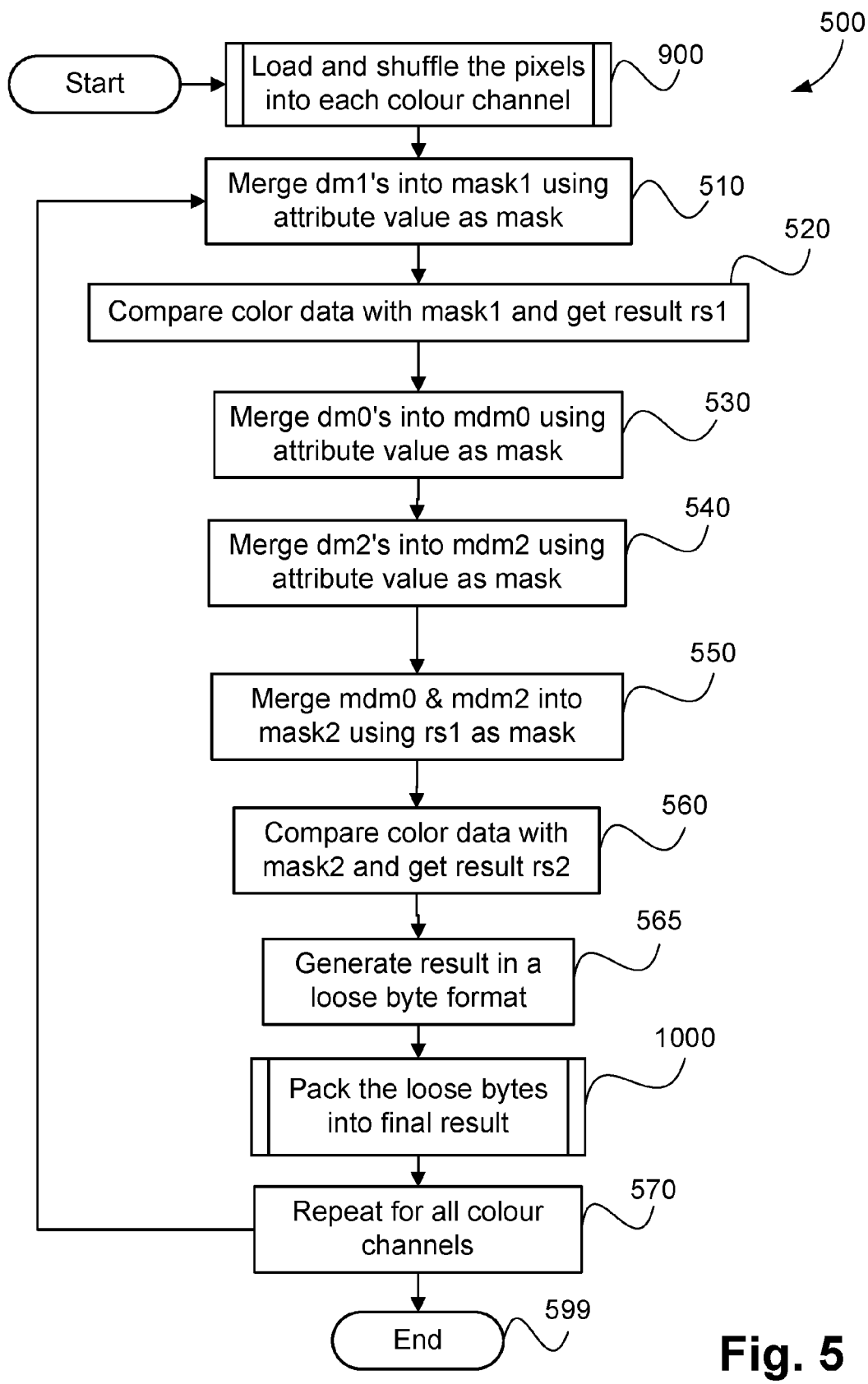
FIG. 5 is a schematic flow diagram illustrating a method of halftoning a pixel run with mixed types of pixels requiring different sets of dithering matrices, as used in the method of FIG. 4.

FIG. 5 illustrates one implementation 500 of using the method of FIG. 4 for performing 8-bit-per-channel to 2-bit-per-channel halftoning on an SIMD pixel run that contains two different types of objects, and which requires a first and second set of dithering matrices by pre-merging the first and second sets of dithering matrices, consistent with the first dithering mode. A matrix dm1 for each channel in each set is used to determine the high bit of the 2-bit-per-channel halftoned pixel, and matrices dm0 and dm2 for each channel in each set are used to determine the low bit. At an initial step 900 of the process 500, the halftone engine loads the rendered page pixels in sequential colour channels, and shuffles the pixels into planar format. Detail of the load and shuffle step 900 is described later with reference to FIG. 9.

At a following step 510, elements of the first pass dithering matrix dm1 values that correspond to pixels in the pixel run from both of the first and second set of dithering matrices for the first colour channel are loaded into SIMD registers (e.g. CPU registers 156-157) of the relevant processor 105, 130. Those first pass dithering matrix elements are then merged together using the attribute value of the pixel run as a mask, using an SIMD merging operation, to be described with reference to FIG. 6. The result of this merging operation is a combined data structure representing a merged first pass dithering mask, saved as mask1, for example, in the registers 154.

At step 520, the pixel run of the first colour channel derived using procedure 900, and for example stored in the intermediate memory 174, is compared to the mask1 generated from step 510, using an SIMD compare operation, to be described with reference to FIG. 7. The result of this operation is saved as rs1, for example, in the registers 154.

At step 530, values of elements of the second pass dithering matrices dm0 corresponding to pixels in the pixel run from both of the first and second set of dithering matrices for the first colour channel are loaded onto the SIMD registers. They are then merged together using the attribute value of the pixel run as mask, using the SIMD merging operation described in FIG. 6, so that a merged second pass dithering matrix can be used for the whole pixel run input despite the attribute value difference. The result of this operation is saved as mdm0, for example, in the registers 154 the merged second pass dithering matrix corresponding to the value "0" of the high output bit.

At step 540, values of the elements of the other second pass dithering matrix dm2 corresponding to pixels in the pixel run from both of the first and second set of dithering matrices for the first colour channel are loaded onto the SIMD registers. The values of those elements are then merged together using the attribute value of the pixel run as mask, using the SIMD merging operation described in FIG. 6. The result of this operation is saved as mdm2, for example, in the intermediate registers 174, the merged second pass dithering matrix corresponding to the value "1" of the high output bit.

Figure 6:
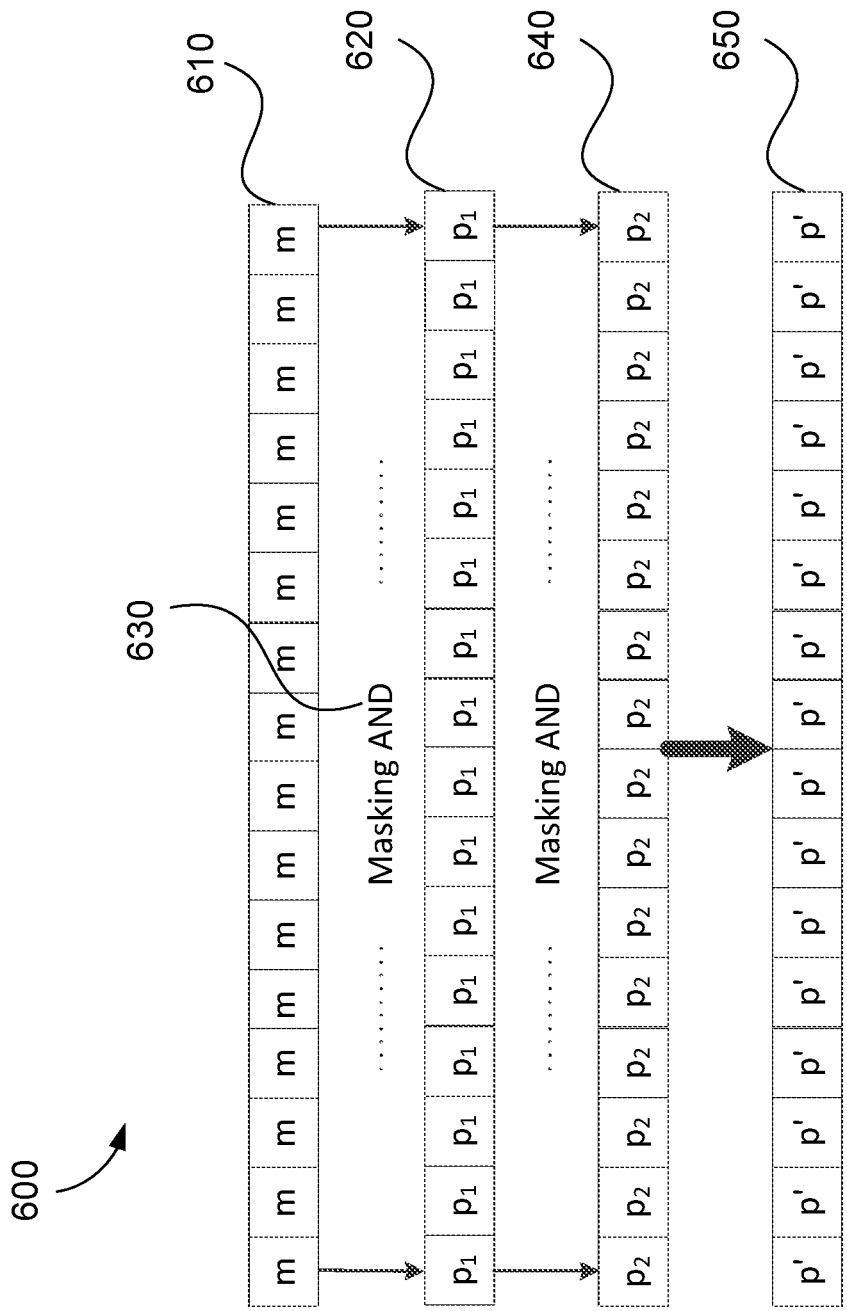
FIG. 6 is an illustration of the SIMD mask-merging operation, as used in the methods of FIG. 5 and FIG. 8.

At step 550, the merged second pass dithering matrices for both conditions of the high output bit mdm0 and mdm2 generated from the previous steps are merged together using rs1, which was generated in step 520, as mask, using the SIMD merging operation described in FIG. 6. The result of this operation is saved as the merged second pass dithering mask mask2, for example, in the intermediate registers 174.

Figure 7:
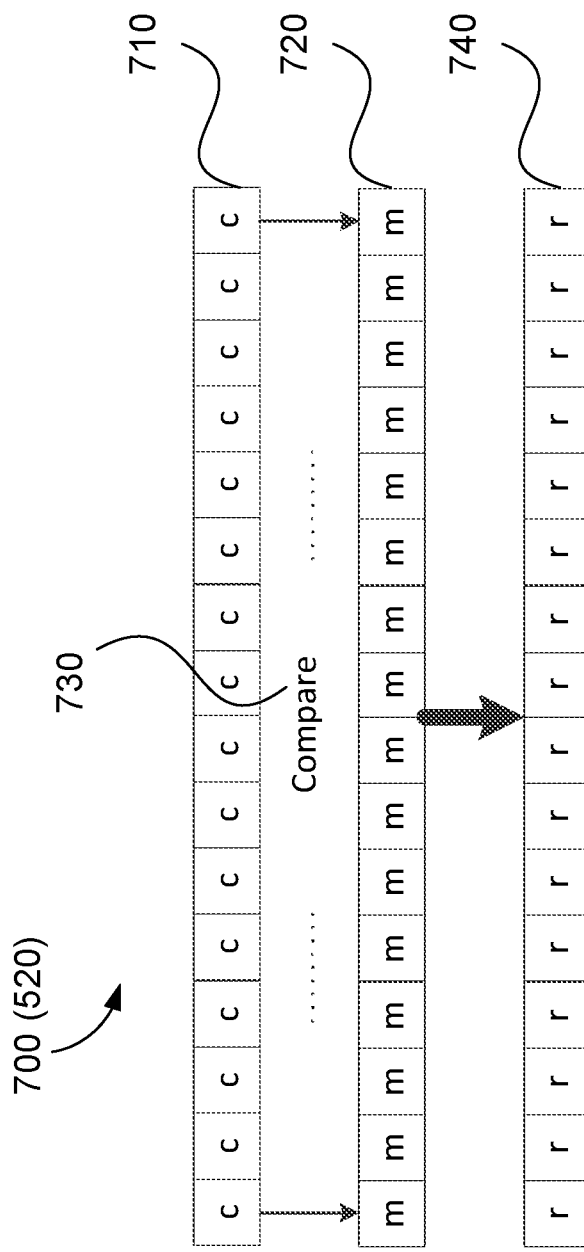
FIG. 7 is an illustration of the SIMD comparing operation, as used in the methods of FIG. 5 and FIG. 8.

At step 560, the pixel run of the first colour channel obtained from procedure 900 is compared to mask2 generated from the previous step 550, using the SIMD compare operation described in FIG. 7. The result of this operation is saved as rs2, for example, in the intermediate registers 174.

At step 565, a loose byte format of the result rs2 is generated. For each pixel in the pixel run, the first bit of the corresponding byte in the loose byte format result is set by the corresponding comparison result in rs1, and the second bit of the corresponding byte in the loose byte format result is set by the corresponding comparison result in rs2.

At step 1000 which follows step 565, the final result of the first colour channel is then generated by an SIMD packing operation, to be described later with reference to FIG. 10.

At step 570 which follows, if there are more colour channels to be processed, the processor 105, 130 loads the pixel run of the next colour channel obtained from procedure 900, and repeats steps 510 to 570. Otherwise the procedure 500 finishes at step 599.

FIG. 6 shows the merging operation 600 on an SIMD-capable processor (105,130), which is used in halftoning methods disclosed below. Register 620 is loaded with a first pixel run of data to be merged, comprising pixel channel values $p_1$. Note that here, this SIMD instruction is used to merge either (a) matrix elements (see also below), or (b) colour channels (i.e., pixel components, not entire pixels). Register 640 is loaded with a second pixel run of data to be merged, comprising pixel channel values $p_2$. A register 610 is loaded with a mask m indicating the pixel run from which the merged result should take its value. The processor 105,130 then executes the SIMD instruction "Masking AND" 630 between the registers 620 and 640 using the register 610. A result comprising a pixel run p' is then generated in SIMD register 650 in one (a single) instruction cycle, where each byte of p' depends on the value of the corresponding byte of mask m. In one implementation, if the value of m is 0, the corresponding value of p' is $p_1$. Otherwise the corresponding value of p' is $p_2$.

For example, for the following input data, expressed in hexadecimal notation:

| | |
|---|---|
| m: | 1 1 1 1 0 0 0 0 |
| $p_1$: | 22 22 22 22 22 22 22 22 |
| $p_2$: | 44 44 44 44 44 44 44 44 | the result after the merging operation is:

| | |
|---|---|
| p': | 44 44 44 44 22 22 22 22 |

It will be appreciated that using an SIMD processor, the merging operation of FIG. 6 provides for concurrent merging of the single input of pixel channel values which occupies the various registers. In addition to merging pixel channel values, the same operation can be applied to merge dither matrix elements and other intermediate values as generated by the methods disclosed herein.

FIG. 7 shows the comparing operation on an SIMD capable processor, which is used in halftoning methods disclosed herein. Register 710 is loaded with a pixel run of colour channel data c. Register 720 is loaded with a mask m containing threshold values to be compared, on a byte-by-byte basis, to c. The processor 105,130 then executes the SIMD instruction "Compare" 730 (i.e. a dithering operation on SIMD, to dither a colour channel of a pixel, the pixel value needs to be compared with a corresponding element in a dithering matrix using SIMD). The result r of this execution is generated in SIMD register 740 in one (a single) instruction cycle as a single output, where, if the corresponding value of c is greater than m, then the corresponding value of r is 0xFF. Otherwise, when less than or equal to m, the value of r is 0x00.

For example, for the following input data, again in hexadecimal notation:

| | |
|---|---|
| c: | 22 22 22 22 22 22 22 22 |
| m: | 10 10 20 20 30 30 40 40 | the result after the compare operation is:

| | |
|---|---|
| r: | FF FF FF FF 00 00 00 00. |

By way of summary, in step 520, rs1 compares colour and mask. In step 550, rs1 is used to select mdm0 if rs1=0, and mdm1 if rs1=1. Then, mdm0 is used if colour<mask. As such, the comparison yields 0 if colour<mask.

It will be appreciated that using an SIMD processor, the comparing operation of FIG. 7 provides for concurrent comparing of the single input run of pixel channel values with a run of dither matrix elements which occupy the various registers.

The SIMD Colour Channel Shuffling Procedure

The input to the halftone engine that implements the process 400 is normally in CMYK colour space for colour printing. To utilize SIMD for halftoning processing, the pixels needs to be re-arranged into planar format.

For example, on a 64-bit SIMD processor, 8 pixels in 8-bit-per-channel CMYK colour space (32 bytes in total) are loaded into memory in the sequence shown below, where each letter indicates a byte of the corresponding colour channel:

C M Y K C M Y K C M Y K C M Y K C M Y K C M Y K C M Y K C M Y K.

The bytes are shuffled into the following planar format so that each plane contains 8 bytes of an individual colour channel, and can therefore be loaded onto a 64-bit SIMD register for SIMD processing, i.e.:

| |
|---|
| C C C C C C C C |
| M M M M M M M M |
| Y Y Y Y Y Y Y Y |
| K K K K K K K K. |

Figure 9:
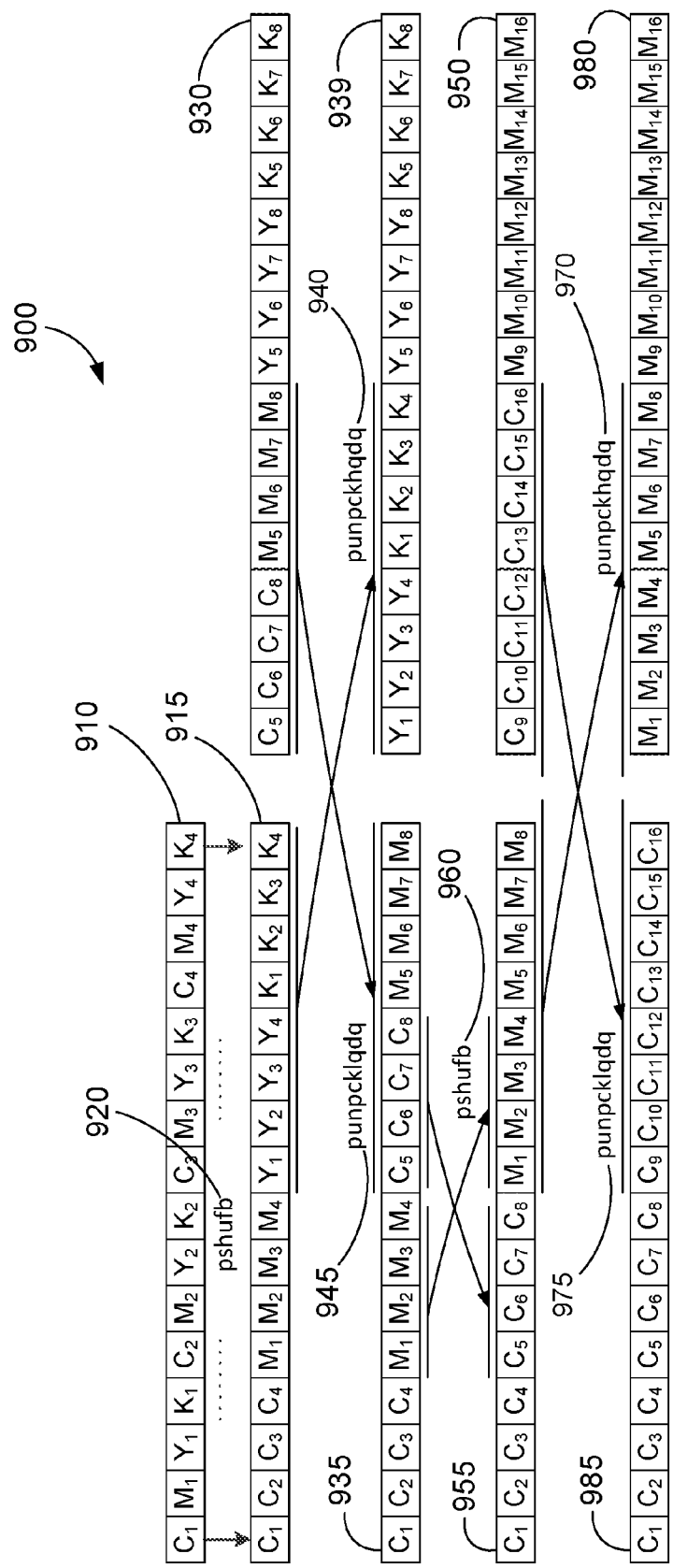
FIG. 9 is an illustration of the colour channel shuffling process using SIMD operations, as used in the methods of FIG. 5 and FIG. 8.

FIG. 9 shows one implementation of the colour channel shuffling procedure 900 using Intel's SSE3 (Streaming SIMD Extension 3) instruction set. Register 910 is one of the four SIMD registers (e.g., 154) that loads 4 of the input page pixels in 8-bit CMYK colour space, $C_1M_1Y_1K_1$ to $C_4M_4Y_4K_4$. The SSE3 instruction Packed Shuffle Bytes "pshufb" 920 is then executed on register 910. The instruction 920 operates to re-arrange the byte sequence to form $C_1C_2C_3C_4$ to $K_1K_2K_3K_4$, as shown in register 915, i.e. the pixel values are grouped into colour channels, so that all "cyan" ($C_1$, $C_2$, $C_3$, $C_4$) colour components are grouped together.

Register 930 is another SIMD register in this case illustrating the results from the same instruction 920 applied to the next 4 pixels, thereby holding pixel component values $C_5C_6C_7C_8$ to $K_5K_6K_7K_8$. SSE3 Interleaving instructions 940 "punpckhqdq" and 945 "punpcklqdq" are then executed to swap the last 8 bytes of register 915, with the first 8 bytes of register 930. The result of these swap (Interleaving) instructions is shown in registers 935 and 939. The result in register 935 contains all the C and M channels of the first 8 page pixels, and the result in register 939 contains all the Y and K channels of the first 8 page pixels.

SSE3 instruction Packed Shuffle Bytes "pshufb" 960 is then executed again to shuffle the bytes in register 935. The result of this instruction is saved in register 955, so that the first 8 bytes are all the C channel values of the first 8 page pixels $C_1$ to $C_8$, and the last 8 bytes are all the M channel values of the first 8 page pixels from $M_1$ to $M_8$. The same sequence of instructions 920 to 960 is applied to the next 8 page pixels $C_9M_9Y_9K_9$ to $C_{16}M_{16}Y_{16}K_{16}$ and the result is saved in register 950, holding pixel channel values $C_9$ to $C_{16}$ and $M_9$ to $M_{16}$.

SSE3 Interleaving instructions "punpckhqdq" 970 and "punpcklqdq" 975 are then executed to swap the last 8 bytes of register 955 with the first 8 bytes of register 950. The result of this swap instruction is saved in register 985 which contains all the C channel values of the 16 page pixels, and the result in register 980 contains all the M channel values of the same 16 page pixels. The Y channel values and K channel values of the same 16 page pixels are not illustrated but can be obtained using the same procedure.

The procedure 900 described above is not needed when halftoning pixels in a single-channel colour space. It will be appreciated that using an SIMD processor, the shuffling operations of FIG. 9 provides for concurrent shuffling of the single input run of pixels which occupies the various registers. The shuffling operations are performed using multiple SIMD instructions each operating on the entire input run of pixels.

The SIMD Packing Procedure

The halftoned results generated from SIMD instructions (i.e. dithering operations on SIMD) are often in what is known as a loose byte representation. An example of a loose byte representation can be explained for an 8-bit contone to 2-bit halftone process. With such a process, the results are often generated as a run of bytes where, in each byte, the first 2 bits are the final result, and the other 6 bits are unused. For such a result, it is necessary to remove the unused bits and pack the results from the 8-bit per channel representation to a 2-bit per channel representation.

Figure 10:
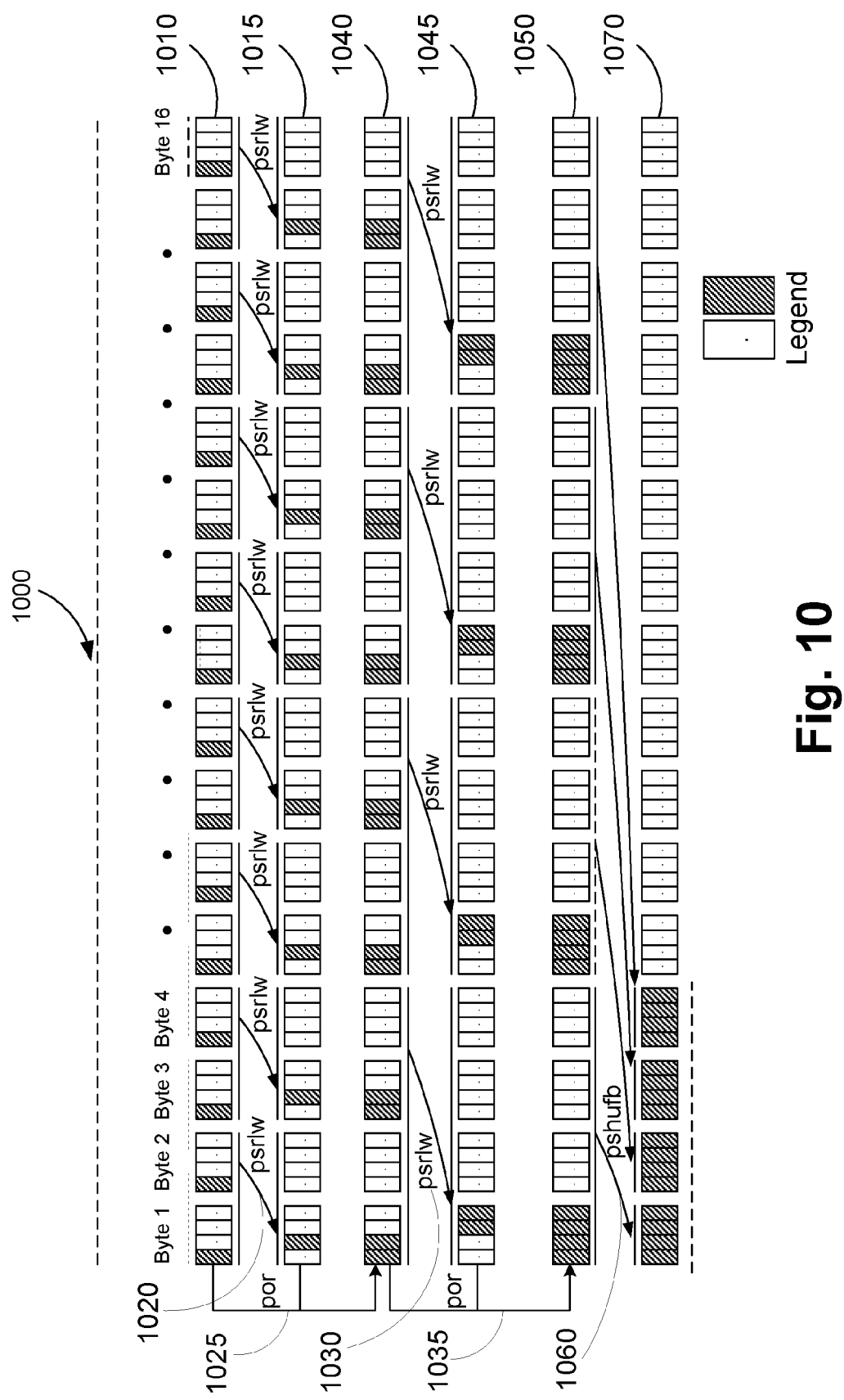
FIG. 10 is an illustration of the result packing process using SIMD operations, as used in the methods of FIG. 5 and FIG. 8.

FIG. 10 shows a method 1000 for performing the packing procedure described above in one implementation, using Intel's SSE3 (Streaming SIMD Extension 3) instruction set. Note that in FIG. 10, bits with white background indicate unused data, whereas bits with shaded background indicate useful data. Using an SIMD processor, the packing procedure of FIG. 10 provides for concurrent packing of the single input of pixels which occupies the various registers. Initially, an SSE3 register 1010 holds an input of 16 bytes of data, labelled Byte 1 through to Byte 16. The first 2 bits of each byte contain valuable data, and the other 6 bits are unused, as shown in the last byte (Byte 16) of the register 1015.

At the first step of the packing process 1000, the SSE3 Shifting instruction "psrlw" 1020 is executed to treat the content in register 1010 in groups of 16 bits and to shift each group 6 bits to the left. The most significant 6 bits of the 16 bits are discarded and the least significant bits are padded with zeros. The result is saved in register 1015. As shown in FIG. 10, the third and fourth most significant bits of each lot of 16 bits contain useful data, other bits being zero.

The SIMD logical OR instruction "por" 1025 is then executed on register 1010 and register 1015. The result of the instruction 1025 is saved in register 1040, with the first 4 bits of every 16 bits containing valuable data. There may be some non-zero bits remaining in other parts of the register but these will be overwritten in the final step 1060 and can be ignored.

The SSE3 Shifting instruction "psrlw" 1030 is then executed to treat the content in register 1040 in groups of 32 bits and to shift each group 12 bits to the left. The result is saved in register 1045. As shown in FIG. 10, the fifth and sixth most significant bits of each lot of 32 bits in 1045 contain useful data. The four most significant bits will be zero. There may be some non-zero bits remaining in other parts of the register but these will be overwritten in the final step 1060 and can be ignored. For example, byte 5 is shifted out and lost in 1045. There are four independent 32-bit shifts. Byte 5 is still retained in 1040 so it can be combined in step 1035.

The SIMD logical OR instruction "por" 1035 is then executed on register 1040 and register 1045. The result is saved in register 1050, with the first 8 bits of every 32 bits containing valuable data. Bytes 7, 11 and 15 still exist but are ignored because they are not used. They will be overwritten in the final step 1060.

Finally, the SSE3 instruction Packed Shuffle Bytes "pshufb" 1060 is executed to shuffle the content in register 1050 into register 1070, so that the first 4 bytes are the 2-bit per channel representation of the input with no unused bits in between. Accordingly all unused bits are discarded.

As explained above in relation to FIG. 4, selection between the two halftoning methods described is made on the basis of the analysis carried out in step 410. In particular, it is preferable to use the second method when the output has more than two bits per colour channel and when the number of sets of matrices required to dither the run is over a second predefined threshold. For example, the second predefined threshold can be set to four sets of matrices required to dither the run. The number of sets of matrices required equals the distinct number of object types requiring different dither matrices that occur in the pixels of the run. This can be determined by examining the attribute data. In the case when the output has two bits per channel but the number of sets of matrices required is over the second threshold, and where the output has more than two bits per channel when the number of sets of matrices required is below the threshold, either method may be used. This notwithstanding, one of the two methods may be preferable based on specifics of a particular implementation.

The first and second predefined thresholds are selected based on the size of the SIMD type registers (e.g. 154) of the processor 105 and particular implementations of SIMD instructions, such as SIMD Colour Channel Shuffling, SIMD Packing, and SIMD merging. For the SSE implementations presently disclosed, the first predefined threshold is set to two sets of dithering matrices and the second predefined threshold is set to four sets of dithering matrices. If, however, at least some of SIMD Colour Channel Shuffling, SIMD Packing, and SIMD merging operations are implemented differently in hardware, other thresholds values may be more suitable. For example, if the SIMD merging instruction can take more than three inputs at a time, the first threshold can be set to two sets of dithering matrices, while the second threshold can be set to three sets of dithering matrices.

Figure 8:
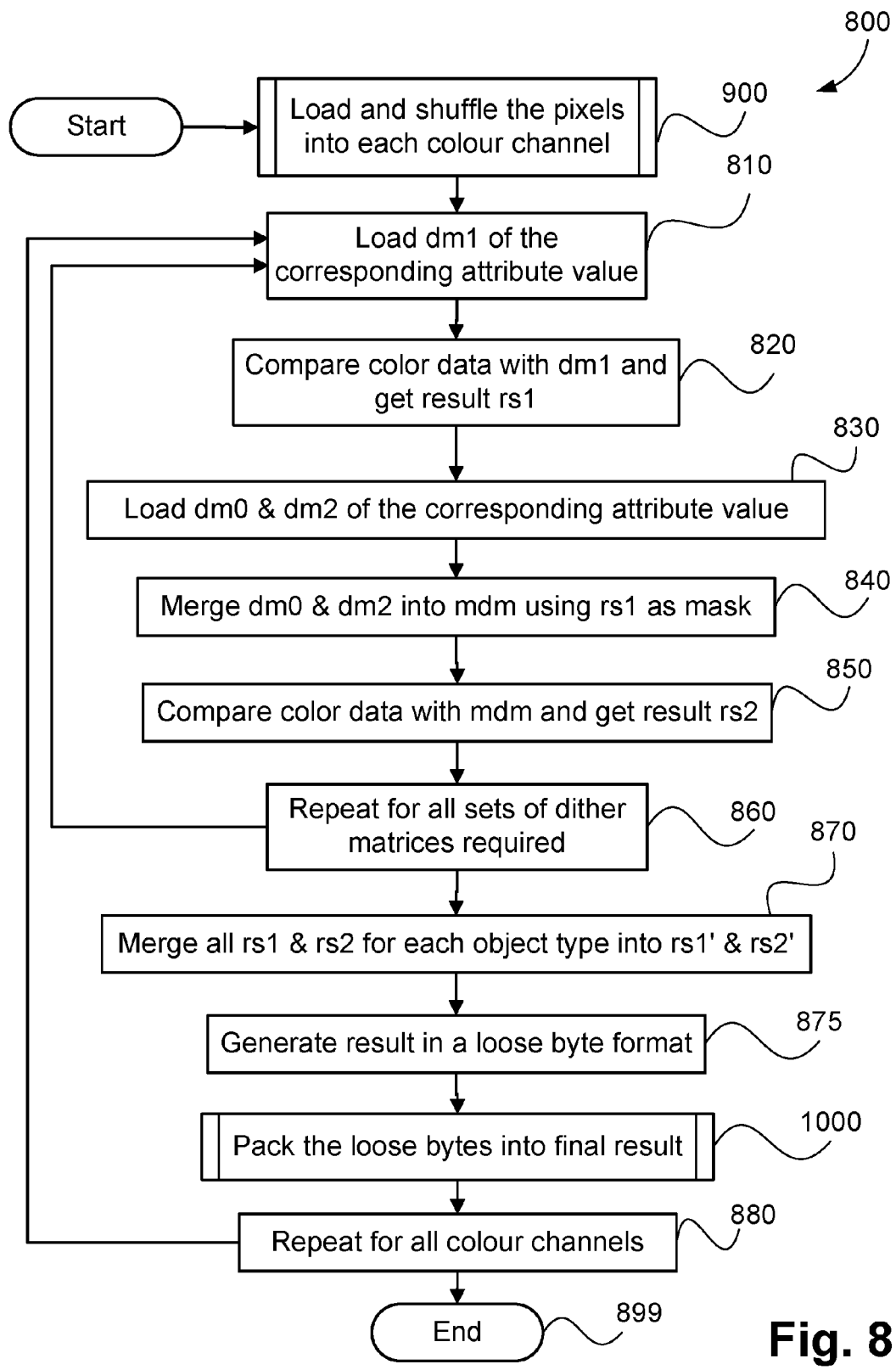
FIG. 8 is a schematic flow diagram illustrating another method of halftoning a pixel run with mixed types of pixels requiring different sets of dithering matrices, as used in the method of FIG. 4.

FIG. 8 illustrates one halftone engine method 800 using this approach, performing 8-bit-per-channel to 2-bit-per-channel halftoning on a pixel run that contains more than two different types of objects and that, as a result, requires more than two sets of dithering matrices, consistent with the second dithering mode. As before, the method 800 may be implemented in software stored in the memory 109 and executable by the processor(s) 105,130 to halftone image data as part of a printing process.

In method 800, the halftone engine initially receives the pixel run to dither and the corresponding attribute data. Firstly, using a procedure 900, the method 800 shuffles the received page pixel data in CMYK colour space into planar format, as described above with reference to FIG. 9.

At step 810, from the set of dithering matrices for the first type of object, the halftone engine selects the elements of the first pass dithering matrix dm1 that correspond to the received pixel run. Step 810 causes the processor 105 to load the values of the selected elements of dm1 for the first colour channel into a register. At step 820, the first colour channel of the pixel run obtained by performing procedure 900 is compared to the loaded dm1 values, using the SIMD compare operation described above with reference to FIG. 7. The result of this operation is saved as rs1, either in memory storage 109, or preferably in an intermediate register.

At step 830, the halftone engine selects elements of the second pass dithering matrices dm0 and dm2 that correspond to the pixel run from the set of dithering matrices for the first object type. Step 830 causes loading of the values of the selected elements of dm0 and dm2 for the first colour channel into registers. At step 840, the dm0 values and dm2 values are merged together using the values in rs1, generated by step 820, as a mask, using the SIMD merging operation described in relation to FIG. 6. The result of this operation is saved as mdm, for example, in an intermediate registers 154.

At step 850, the pixel run of the first colour channel from procedure 900 is compared to mdm, using the SIMD compare operation described in relation to FIG. 7. The result of this operation is saved as rs2, for example, in an intermediate register.

At step 860, the procedure from step 810 to step 850 described above is repeated until the pixel run of the first colour channel is processed with all required sets of dithering matrices, for all the different types of objects contained in the input pixel run. Each iteration will generate a separate instance of rs1 and rs2 corresponding to each of the different sets of matrices required for the various object types occurring in the pixel run. In this fashion, each dithering matrix produces one bit of the multi-bit output.

Note that so far, the method of FIG. 8 processes all pixels in the pixel run by all sets of matrices, regardless of the object type associated with any individual pixel. One instance of a1 is generated in each iteration of step 820, being one instance for each set of matrices required for dithering the pixel run. At step 870, all the generated instances of a1 are merged together using the attribute data of the pixel run as mask, using the SIMD merging operation described in FIG. 6, two at a time. The result of this operation is saved as rs1', for example, in an intermediate register. Similarly, all the instances of rs2 generated in iterations of step 850 are merged together as rs2', for example, in an intermediate register. By summary, in step 870, the results of applying the different matrices are merged into a single dithered pixel run comprising appropriately dithered spans.

At step 875, the results rs1' and rs2' are generated in a loose byte format. For each pixel in the pixel run, the first bit of the corresponding byte in the loose byte format result is set by the corresponding comparison result in rs1', and the second bit of the corresponding byte in the loose byte format result is set by the corresponding comparison result in rs2'. The loose byte result may be stored in the storage 109.

In procedure 1000, the final result for the first colour channel of the pixel run is then generated by the SIMD packing procedure as described in FIG. 10.

At step 880, the procedure from step 810 to step 1000 is repeated until all colour channels of the pixel run are processed and produced as output. Once halftoned pixels are so produced, that pixels may be sent to the printer engine 110 for hard copy reproduction on a medium such as paper.

Example(s)

Figure 11:
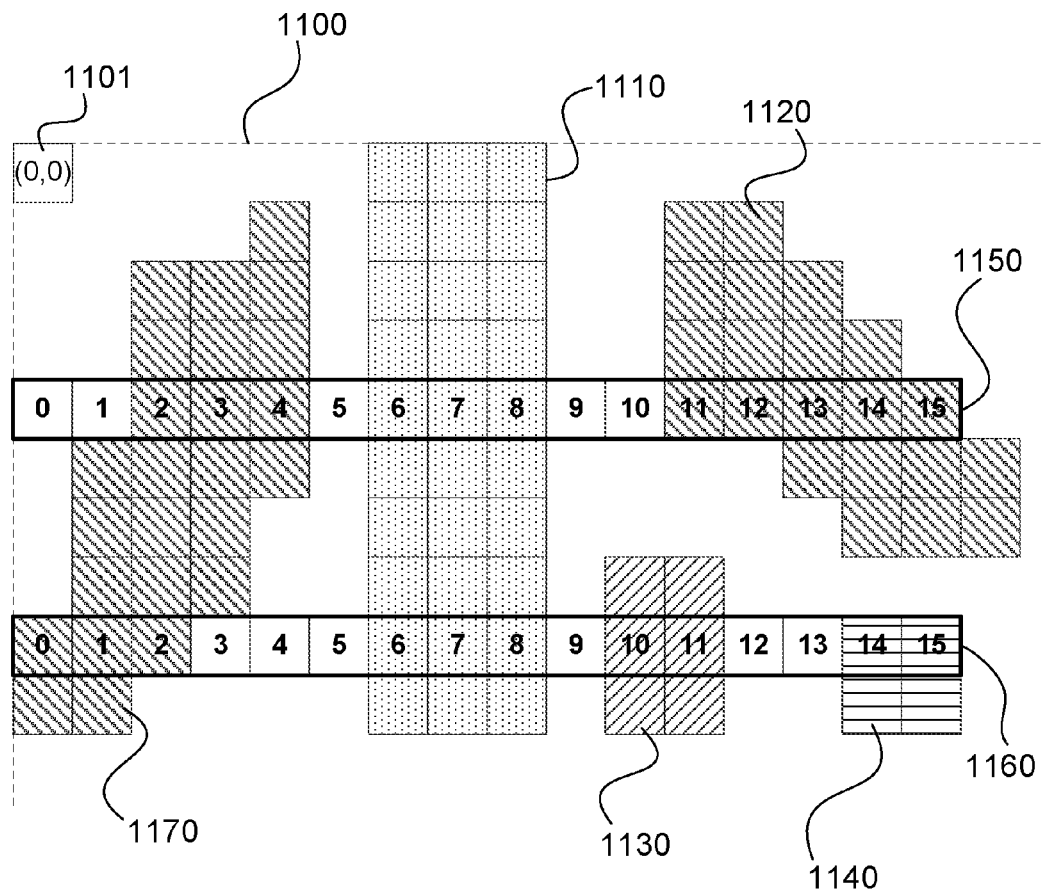
FIG. 11 is a diagram showing an area of a page of rendered pixels to be halftoned, containing pixels of several different types which require different sets of dithering matrices.

FIG. 11 is a diagram showing an area of an example page 1100 of rendered pixels in a K (black) colour space to be halftoned from 8-bits per channel to 2-bits per channel. The area contains pixels of several different types of objects, each of which requires a different set of dithering matrices. The halftoning example is to be performed on an Intel x86 CPU with SSE3 instruction set support using an implementation discussed above. The page starts from pixel (0, 0) 1101 at the top left corner of the page 1100, only a portion of which is outlined for the sake of clarity. Pixel 0 of pixel run 1150 is at location (0, 4) on the page 1100, and pixel 0 of pixel run 1160 is at location (0, 8) on the page 1100.

A region 1110 contains pixels rendered from a type of object (for example, graphics) that requires to be dithered with a set of dithering matrices labelled "GRADATION", discussed below. Region 1120 and region 1170 contain pixels rendered from a type of object (for example, images) that requires to be dithered with a set of dithering matrices labelled "RESOLUTION". Region 1130 contains pixels (for example, high resolution images) required to be dithered with a set of dithering matrices labelled "HIGH_RESOLUTION". Region 1140 contains pixels (for example, coloured text) required to be dithered with a set of dithering matrices labelled "TONE".

There are four sets of 8-bit to 2-bit K channel dithering matrices to be used for the different types of objects. The dithering matrices are listed as below, in which all matrix coefficients are shown in hexadecimal:

---

GRADATION set (width = 10 pixels, height = 10 pixels):
m0 = {
00, 1b, 87, c3, 4b, 00, 1c, 89, c5, 4d, 57, 03, 23, 93, cf, 59, 03, 24, 95, d1, c7, 4f, 01, 1d,
8b, c9, 51, 01, 1e, 8d, 97, d3, 5b, 04, 26, 99, d5, 5d, 04, 27, 20, 8f, cb, 53, 02, 21,
91, cd, 55, 02, 00, 1c, 8a, c6, 4e, 00, 1b, 88, c4, 4c, 5a, 03, 25, 96, d2, 58, 03,
23, 94, d0, ca, 52, 01, 1f, 8e, c8, 50, 01, 1d, 8c,
9a, d6, 5e, 04, 28, 98, d4, 5c, 04, 26, 22, 92, ce, 56, 02, 20, 90, cc, 54, 02}

```
m1 = {
05, 29, 9b, d7, 5f, 07, 2a, 9d, d9, 61,
6b, 0c, 32, a7, e3, 6d, 0d, 33, a9, e5,
db, 63, 08, 2c, 9f, dd, 65, 09, 2d, a1,
ab, e7, 6f, 0e, 35, ad, e9, 71, 10, 36,
2f, a3, df, 67, 0a, 30, a5, e1, 69, 0b,
07, 2b, 9e, da, 62, 06, 29, 9c, d8, 60,
6e, 0e, 34, aa, e6, 6c, 0c, 32, a8, e4,
de, 66, 09, 2e, a2, dc, 64, 08, 2c, a0,
ae, ea, 72, 10, 37, ac, e8, 70, 0f, 35,
31, a6, e2, 6a, 0b, 2f, a4, e0, 68, 0a}
m2 = {
11, 38, af, eb, 73, 12, 39, b1, ed, 75,
7f, 17, 43, bb, f7, 81, 18, 45, bd, f9,
ef, 77, 13, 3b, b3, f1, 79, 14, 3d, b5,
bf, fb, 83, 19, 47, c1, fd, 85, 1a, 49,
3f, b7, f3, 7b, 15, 41, b9, f5, 7d, 16,
12, 3a, b2, ee, 76, 11, 38, b0, ec, 74,
82, 18, 46, be, fa, 80, 17, 44, bc, f8,
f2, 7a, 14, 3e, b6, f0, 78, 13, 3c, b4,
c2, fe, 86, 1a, 4a, c0, fc, 84, 19, 48,
42, ba, f6, 7e, 16, 40, b8, f4, 7c, 15}
RESOLUTION set (width = 16 pixels, height = 16 pixels):
m0 = {
5d, 9f, 2d, 76, 5f, a3, 2f, 78, 5d, a0, 2d, 76, 5f, a4, 2f, 78,
2d, 76, 5f, a4, 2f, 78, 00, 14, cf, 45, 00, 17, d3, 47, 00, 15,
00, 17, d3, 47, 00, 15, d0, 45, 00, 17, d4, 47, 32, 7c, 63, ab,
d4, 47, 32, 7c, 63, ab, 33, 7d, 62, aa, 32, 7c, 63, ac, 33, 7e,
32, 7c, 63, ac, 33, 7e, 62, a9, d9, 4a, 03, 1b, db, 4b, 02, 1a,
03, 1b, db, 4b, 02, 1a, da, 4a, 03, 1b, dc, 4b, 02, 1a, 60, a5,
dc, 4b, 02, 1a, 60, a5, 30, 79, 5e, a2, 2e, 77, 60, a6, 30, 7a,
2e, 77, 60, a6, 30, 7a, 5e, a1, 2e, 77, 00, 18, d5, 48, 00, 16,
00, 18, d5, 48, 00, 16, d2, 46, 00, 18, d6, 48, 00, 15, d1, 46,
d6, 48, 00, 15, d1, 46, 34, 7f, 61, a8, 31, 7b, 64, ae, 34, 7f,
31, 7b, 64, ae, 34, 7f, 61, a7, 31, 7b, 64, ad, dd, 4c, 01, 19,
64, ad, dd, 4c, 01, 19, d8, 49, 04, 1c, de, 4c, 01, 19, d7, 49,
de, 4c, 01, 19, d7, 49, 04, 1c, 5d, a0, 2d, 76, 5f, a4, 2f, 78,
2d, 76, 5f, a4, 2f, 78, 5d, 9f, 2d, 76, 5f, a3, 2f, 78, 00, 15,
5f, a3, 2f, 78, 00, 15, d0, 45, 00, 17, d4, 47, 00, 14, cf, 45,
d4, 47, 00, 14, cf, 45, 00, 17, d3, 47, 32, 7c, 63, ac, 33, 7e}
m1 = {
65, af, 35, 80, 67, b3, 37, 83, 65, b0, 35, 80, 67, b4, 37, 84,
35, 80, 67, b4, 37, 84, 05, 1d, df, 4d, 07, 1f, e3, 4f, 05, 1d,
07, 1f, e3, 4f, 05, 1d, e0, 4d, 07, 1f, e4, 4f, 3a, 89, 6b, bb,
e4, 4f, 3a, 89, 6b, bb, 3b, 8b, 6a, ba, 3a, 8a, 6b, bc, 3b, 8c,
3a, 8a, 6b, bc, 3b, 8c, 6a, b9, e9, 52, 09, 23, eb, 53, 09, 22,
09, 23, eb, 53, 09, 22, ea, 52, 0a, 23, ec, 53, 09, 22, 68, b5,
ec, 53, 09, 22, 68, b5, 38, 85, 66, b2, 36, 82, 68, b6, 38, 86,
36, 82, 68, b6, 38, 86, 66, b1, 36, 81, 07, 20, e5, 50, 06, 1e,
07, 20, e5, 50, 06, 1e, e2, 4e, 07, 20, e6, 50, 06, 1e, e1, 4e,
e6, 50, 06, 1e, e1, 4e, 3c, 8d, 69, b8, 39, 88, 6c, be, 3c, 8e,
39, 88, 6c, be, 3c, 8e, 69, b7, 39, 87, 6c, bd, ed, 54, 08, 21,
6c, bd, ed, 54, 08, 21, e8, 51, 0b, 24, ee, 54, 08, 21, e7, 51,
ee, 54, 08, 21, e7, 51, 0b, 24, 65, b0, 35, 80, 67, b4, 37, 84,
35, 80, 67, b4, 37, 84, 65, af, 35, 80, 67, b3, 37, 83, 05, 1d,
67, b3, 37, 83, 05, 1d, e0, 4d, 07, 1f, e4, 4f, 05, 1d, df, 4d,
e4, 4f, 05, 1d, df, 4d, 07, 1f, e3, 4f, 3a, 8a, 6b, bc, 3b, 8c}
m2 = {
6d, bf, 3d, 8f, 6f, c3, 3f, 93, 6d, c0, 3d, 90, 6f, c4, 3f, 94,
3d, 90, 6f, c4, 3f, 94, 0b, 25, ef, 55, 0e, 27, f3, 57, 0c, 25,
0e, 27, f3, 57, 0c, 25, f0, 55, 0e, 27, f4, 57, 42, 99, 74, cb,
f4, 57, 42, 99, 74, cb, 43, 9b, 73, ca, 42, 9a, 74, cc, 43, 9c,
42, 9a, 74, cc, 43, 9c, 72, c9, f9, 5a, 11, 2b, fb, 5b, 11, 2a,
11, 2b, fb, 5b, 11, 2a, fa, 5a, 12, 2b, fc, 5b, 10, 2a, 70, c5,
fc, 5b, 10, 2a, 70, c5, 40, 95, 6e, c2, 3e, 92, 70, c6, 40, 96,
3e, 92, 70, c6, 40, 96, 6e, c1, 3e, 91, 0e, 28, f5, 58, 0d, 26,
0e, 28, f5, 58, 0d, 26, f2, 56, 0e, 28, f6, 58, 0c, 26, f1, 56,
f6, 58, 0c, 26, f1, 56, 44, 9d, 71, c8, 41, 98, 75, ce, 44, 9e,
41, 98, 75, ce, 44, 9e, 71, c7, 41, 97, 75, cd, fd, 5c, 0f, 29,
75, cd, fd, 5c, 0f, 29, f8, 59, 13, 2c, fe, 5c, 0f, 29, f7, 59,
fe, 5c, 0f, 29, f7, 59, 13, 2c, 6d, c0, 3d, 90, 6f, c4, 3f, 94,
3d, 90, 6f, c4, 3f, 94, 6d, bf, 3d, 8f, 6f, c3, 3f, 93, 0c, 25,
6f, c3, 3f, 93, 0c, 25, f0, 55, 0e, 27, f4, 57, 0b, 25, ef, 55,
f4, 57, 0b, 25, ef, 55, 0e, 27, f3, 57, 42, 9a, 74, cc, 43, 9c}
HIGH_RESOLUTION set (width = 20 pixels, height = 20 pixels):
m0 = {
ba, 62, 02, 8e, 2e, c5, 5b, 00, 97, 37, bc, 64, 02, 90, 30, c3, 5d, 00, 99, 39,
bc, 64, 02, 90, 30, c3, 5d, 00, 99, 39, ba, 62, 02, 8e, 2e, c5, 5b, 00, 97, 37,
ba, 62, 02, 8e, 2e, c5, 5b, 00, 97, 37, bc, 64, 02, 90, 30, c3, 5d, 00, 99, 39,
```

```
bc, 64, 02, 90, 30, c3, 5d, 00, 99, 39, 8a, 2a, c6, 5e, 01, 95, 35, c1, 67, 03,
8a, 2a, c6, 5e, 01, 95, 35, c1, 67, 03, 8c, 2c, c8, 60, 01, 93, 33, bf, 69, 03,
8c, 2c, c8, 60, 01, 93, 33, bf, 69, 03, 8a, 2a, c6, 5e, 01, 95, 35, c1, 67, 03,
8a, 2a, c6, 5e, 01, 95, 35, c1, 67, 03, 8c, 2c, c8, 60, 01, 93, 33, bf, 69, 03,
8c, 2c, c8, 60, 01, 93, 33, bf, 69, 03, 5a, 00, 96, 36, bd, 65, 02, 91, 31, c2,
5a, 00, 96, 36, bd, 65, 02, 91, 31, c2, 5c, 00, 98, 38, bb, 63, 02, 8f, 2f, c4,
5c, 00, 98, 38, bb, 63, 02, 8f, 2f, c4, 5a, 00, 96, 36, bd, 65, 02, 91, 31, c2,
5a, 00, 96, 36, bd, 65, 02, 91, 31, c2, 5c, 00, 98, 38, bb, 63, 02, 8f, 2f, c4,
5c, 00, 98, 38, bb, 63, 02, 8f, 2f, c4, 34, c0, 66, 03, 8d, 2d, c9, 61, 01, 92,
34, c0, 66, 03, 8d, 2d, c9, 61, 01, 92, 32, be, 68, 03, 8b, 2b, c7, 5f, 01, 94,
32, be, 68, 03, 8b, 2b, c7, 5f, 01, 94, 34, c0, 66, 03, 8d, 2d, c9, 61, 01, 92,
34, c0, 66, 03, 8d, 2d, c9, 61, 01, 92, 32, be, 68, 03, 8b, 2b, c7, 5f, 01, 94,
32, be, 68, 03, 8b, 2b, c7, 5f, 01, 94, 02, 90, 30, c3, 5d, 00, 99, 39, ba, 62,
02, 90, 30, c3, 5d, 00, 99, 39, ba, 62, 02, 8e, 2e, c5, 5b, 00, 97, 37, bc, 64,
02, 8e, 2e, c5, 5b, 00, 97, 37, bc, 64, 02, 90, 30, c3, 5d, 00, 99, 39, ba, 62,
02, 90, 30, c3, 5d, 00, 99, 39, ba, 62, 02, 8e, 2e, c5, 5b, 00, 97, 37, bc, 64,
02, 8e, 2e, c5, 5b, 00, 97, 37, bc, 64, c8, 60, 01, 93, 33, bf, 69, 03, 8a, 2a}
m1 = {
ca, 72, 12, 9e, 3e, d5, 6b, 06, a7, 47, cc, 74, 14, a0, 40, d3, 6d, 09, a9, 49,
cc, 74, 14, a0, 40, d3, 6d, 09, a9, 49, ca, 72, 12, 9e, 3e, d6, 6b, 07, a7, 47,
ca, 72, 12, 9e, 3e, d6, 6b, 07, a7, 47, cc, 74, 14, a0, 40, d3, 6d, 0a, a9, 49,
cc, 74, 14, a0, 40, d3, 6d, 0a, a9, 49, 9a, 3a, d7, 6e, 0b, a5, 45, d1, 77, 17,
9a, 3a, d7, 6e, 0b, a5, 45, d1, 77, 17, 9c, 3c, dc, 70, 0f, a3, 43, cf, 79, 19,
9c, 3c, dc, 70, 0f, a3, 43, cf, 79, 19, 9a, 3a, d8, 6e, 0c, a5, 45, d1, 77, 17,
9a, 3a, d8, 6e, 0c, a5, 45, d1, 77, 17, 9c, 3c, db, 70, 0e, a3, 43, cf, 79, 19,
9c, 3c, db, 70, 0e, a3, 43, cf, 79, 19, 6a, 04, a6, 46, cd, 75, 15, a1, 41, d2,
6a, 04, a6, 46, cd, 75, 15, a1, 41, d2, 6c, 09, a8, 48, cb, 73, 13, 9f, 3f, d4,
6c, 09, a8, 48, cb, 73, 13, 9f, 3f, d4, 6a, 05, a6, 46, cd, 75, 15, a1, 41, d2,
6a, 05, a6, 46, cd, 75, 15, a1, 41, d2, 6c, 08, a8, 48, cb, 73, 13, 9f, 3f, d4,
6c, 08, a8, 48, cb, 73, 13, 9f, 3f, d4, 44, d0, 76, 16, 9d, 3d, dd, 71, 10, a2,
44, d0, 76, 16, 9d, 3d, dd, 71, 10, a2, 42, ce, 78, 18, 9b, 3b, da, 6f, 0d, a4,
42, ce, 78, 18, 9b, 3b, da, 6f, 0d, a4, 44, d0, 76, 16, 9d, 3d, de, 71, 11, a2,
44, d0, 76, 16, 9d, 3d, de, 71, 11, a2, 42, ce, 78, 18, 9b, 3b, d9, 6f, 0d, a4,
42, ce, 78, 18, 9b, 3b, d9, 6f, 0d, a4, 14, a0, 40, d3, 6d, 09, a9, 49, ca, 72,
14, a0, 40, d3, 6d, 09, a9, 49, ca, 72, 12, 9e, 3e, d6, 6b, 07, a7, 47, cc, 74,
12, 9e, 3e, d6, 6b, 07, a7, 47, cc, 74, 14, a0, 40, d3, 6d, 0a, a9, 49, ca, 72,
14, a0, 40, d3, 6d, 0a, a9, 49, ca, 72, 12, 9e, 3e, d5, 6b, 06, a7, 47, cc, 74,
12, 9e, 3e, d5, 6b, 06, a7, 47, cc, 74, dc, 70, 0f, a3, 43, cf, 79, 19, 9a, 3a}
m2 = {
df, 82, 22, ae, 4e, f5, 7b, 1b, b7, 57, e4, 84, 24, b0, 50, f2, 7d, 1d, b9, 59,
e4, 84, 24, b0, 50, f2, 7d, 1d, b9, 59, e0, 82, 22, ae, 4e, f6, 7b, 1b, b7, 57,
e0, 82, 22, ae, 4e, f6, 7b, 1b, b7, 57, e3, 84, 24, b0, 50, f1, 7d, 1d, b9, 59,
e3, 84, 24, b0, 50, f1, 7d, 1d, b9, 59, aa, 4a, f7, 7e, 1e, b5, 55, ed, 87, 27,
aa, 4a, f7, 7e, 1e, b5, 55, ed, 87, 27, ac, 4c, fc, 80, 20, b3, 53, ea, 89, 29,
ac, 4c, fc, 80, 20, b3, 53, ea, 89, 29, aa, 4a, f8, 7e, 1e, b5, 55, ee, 87, 27,
aa, 4a, f8, 7e, 1e, b5, 55, ee, 87, 27, ac, 4c, fb, 80, 20, b3, 53, e9, 89, 29,
ac, 4c, fb, 80, 20, b3, 53, e9, 89, 29, 7a, 1a, b6, 56, e5, 85, 25, b1, 51, f0,
7a, 1a, b6, 56, e5, 85, 25, b1, 51, f0, 7c, 1c, b8, 58, e2, 83, 23, af, 4f, f3,
7c, 1c, b8, 58, e2, 83, 23, af, 4f, f3, 7a, 1a, b6, 56, e6, 85, 25, b1, 51, ef,
7a, 1a, b6, 56, e6, 85, 25, b1, 51, ef, 7c, 1c, b8, 58, e1, 83, 23, af, 4f, f4,
7c, 1c, b8, 58, e1, 83, 23, af, 4f, f4, 54, ec, 86, 26, ad, 4d, fd, 81, 21, b2,
54, ec, 86, 26, ad, 4d, fd, 81, 21, b2, 52, e8, 88, 28, ab, 4b, fa, 7f, 1f, b4,
52, e8, 88, 28, ab, 4b, fa, 7f, 1f, b4, 54, eb, 86, 26, ad, 4d, fe, 81, 21, b2,
54, eb, 86, 26, ad, 4d, fe, 81, 21, b2, 52, e7, 88, 28, ab, 4b, f9, 7f, 1f, b4,
52, e7, 88, 28, ab, 4b, f9, 7f, 1f, b4, 24, b0, 50, f2, 7d, 1d, b9, 59, e0, 82,
24, b0, 50, f2, 7d, 1d, b9, 59, e0, 82, 22, ae, 4e, f6, 7b, 1b, b7, 57, e3, 84,
22, ae, 4e, f6, 7b, 1b, b7, 57, e3, 84, 24, b0, 50, f1, 7d, 1d, b9, 59, df, 82,
24, b0, 50, f1, 7d, 1d, b9, 59, df, 82, 22, ae, 4e, f5, 7b, 1b, b7, 57, e4, 84,
22, ae, 4e, f5, 7b, 1b, b7, 57, e4, 84, fc, 80, 20, b3, 53, ea, 89, 29, aa, 4a}
TONE set (width = 20 pixels, height = 20 pixels):
m0 = {
26, 7a, e7, d7, 49, 31, 55, a9, 5f, 17, 23, 77, ee, da, 48, 30, 54, a8, 62, 1a,
23, 77, ee, da, 48, 30, 54, a8, 62, 1a, 26, 7a, e8, d7, 49, 31, 55, a9, 5f, 17,
26, 7a, e8, d7, 49, 31, 55, a9, 5f, 17, 23, 77, ed, da, 48, 30, 54, a8, 62, 1a,
23, 77, ed, da, 48, 30, 54, a8, 62, 1a, 92, c2, cb, b3, 3d, 01, 0d, 6d, 9b, 83,
92, c2, cb, b3, 3d, 01, 0d, 6d, 9b, 83, 8f, bf, ce, b6, 3c, 00, 0c, 6c, 9e, 86,
8f, bf, ce, b6, 3c, 00, 0c, 6c, 9e, 86, 92, c2, cb, b3, 3d, 01, 0d, 6d, 9b, 83,
92, c2, cb, b3, 3d, 01, 0d, 6d, 9b, 83, 8f, bf, ce, b6, 3c, 00, 0c, 6c, 9e, 86,
8f, bf, ce, b6, 3c, 00, 0c, 6c, 9e, 86, 47, 2f, 53, a7, 61, 19, 25, 79, e9, d8,
47, 2f, 53, a7, 61, 19, 25, 79, e9, d8, 4a, 32, 56, aa, 60, 18, 24, 78, eb, d9,
4a, 32, 56, aa, 60, 18, 24, 78, eb, d9, 47, 2f, 53, a7, 61, 19, 25, 79, ea, d8,
47, 2f, 53, a7, 61, 19, 25, 79, ea, d8, 4a, 32, 56, aa, 60, 18, 24, 78, ec, d9,
4a, 32, 56, aa, 60, 18, 24, 78, ec, d9, 3b, 00, 0b, 6b, 9d, 85, 91, c1, cc, b4,
3b, 00, 0b, 6b, 9d, 85, 91, c1, cc, b4, 3e, 02, 0e, 6e, 9c, 84, 90, c0, cd, b5,
3e, 02, 0e, 6e, 9c, 84, 90, c0, cd, b5, 3b, 00, 0b, 6b, 9d, 85, 91, c1, cc, b4,
3b, 00, 0b, 6b, 9d, 85, 91, c1, cc, b4, 3e, 02, 0e, 6e, 9c, 84, 90, c0, cd, b5,
3e, 02, 0e, 6e, 9c, 84, 90, c0, cd, b5, 5f, 17, 23, 77, ed, da, 48, 30, 54, a8,
5f, 17, 23, 77, ed, da, 48, 30, 54, a8, 62, 1a, 26, 7a, e7, d7, 49, 31, 55, a9,
62, 1a, 26, 7a, e7, d7, 49, 31, 55, a9, 5f, 17, 23, 77, ee, da, 48, 30, 54, a8,
```

-continued 5f, 17, 23, 77, ee, da, 48, 30, 54, a8, 62, 1a, 26, 7a, e8, d7, 49, 31, 55, a9,
62, 1a, 26, 7a, e8, d7, 49, 31, 55, a9, 9b, 83, 8f, bf, ce, b6, 3c, 00, 0c, 6c}
m1 = {
2a, 7e, ef, db, 4d, 35, 59, ad, 63, 1b, 27, 7b, f6, de, 4c, 34, 58, ac, 66, 1e,
27, 7b, f6, de, 4c, 34, 58, ac, 66, 1e, 2a, 7e, f0, db, 4d, 35, 59, ad, 63, 1b,
2a, 7e, f0, db, 4d, 35, 59, ad, 63, 1b, 27, 7b, f5, de, 4c, 34, 58, ac, 66, 1e,
27, 7b, f5, de, 4c, 34, 58, ac, 66, 1e, 96, c6, cf, b7, 41, 05, 11, 71, 9f, 87,
96, c6, cf, b7, 41, 05, 11, 71, 9f, 87, 93, c3, d2, ba, 40, 04, 10, 70, a2, 8a,
93, c3, d2, ba, 40, 04, 10, 70, a2, 8a, 96, c6, cf, b7, 41, 05, 11, 71, 9f, 87,
96, c6, cf, b7, 41, 05, 11, 71, 9f, 87, 93, c3, d2, ba, 40, 04, 10, 70, a2, 8a,
93, c3, d2, ba, 40, 04, 10, 70, a2, 8a, 4b, 33, 57, ab, 65, 1d, 29, 7d, f1, dc,
4b, 33, 57, ab, 65, 1d, 29, 7d, f1, dc, 4e, 36, 5a, ae, 64, 1c, 28, 7c, f3, dd,
4e, 36, 5a, ae, 64, 1c, 28, 7c, f3, dd, 4b, 33, 57, ab, 65, 1d, 29, 7d, f2, dc,
4b, 33, 57, ab, 65, 1d, 29, 7d, f2, dc, 4e, 36, 5a, ae, 64, 1c, 28, 7c, f4, dd,
4e, 36, 5a, ae, 64, 1c, 28, 7c, f4, dd, 3f, 03, 0f, 6f, a1, 89, 95, c5, d0, b8,
3f, 03, 0f, 6f, a1, 89, 95, c5, d0, b8, 42, 06, 12, 72, a0, 88, 94, c4, d1, b9,
42, 06, 12, 72, a0, 88, 94, c4, d1, b9, 3f, 03, 0f, 6f, a1, 89, 95, c5, d0, b8,
3f, 03, 0f, 6f, a1, 89, 95, c5, d0, b8, 42, 06, 12, 72, a0, 88, 94, c4, d1, b9,
42, 06, 12, 72, a0, 88, 94, c4, d1, b9, 63, 1b, 27, 7b, f5, de, 4c, 34, 58, ac,
63, 1b, 27, 7b, f5, de, 4c, 34, 58, ac, 66, 1e, 2a, 7e, ef, db, 4d, 35, 59, ad,
66, 1e, 2a, 7e, ef, db, 4d, 35, 59, ad, 63, 1b, 27, 7b, f6, de, 4c, 34, 58, ac,
63, 1b, 27, 7b, f6, de, 4c, 34, 58, ac, 66, 1e, 2a, 7e, f0, db, 4d, 35, 59, ad,
66, 1e, 2a, 7e, f0, db, 4d, 35, 59, ad, 9f, 87, 93, c3, d2, ba, 40, 04, 10, 70}
m2 = {
2e, 82, f7, df, 51, 39, 5d, b1, 67, 1f, 2b, 7f, fe, e6, 50, 38, 5c, b0, 6a, 22,
2b, 7f, fe, e6, 50, 38, 5c, b0, 6a, 22, 2e, 82, f8, e0, 51, 39, 5d, b1, 67, 1f,
2e, 82, f8, e0, 51, 39, 5d, b1, 67, 1f, 2b, 7f, fd, e5, 50, 38, 5c, b0, 6a, 22,
2b, 7f, fd, e5, 50, 38, 5c, b0, 6a, 22, 9a, ca, d3, bb, 45, 09, 15, 75, a3, 8b,
9a, ca, d3, bb, 45, 09, 15, 75, a3, 8b, 97, c7, d6, be, 44, 08, 14, 74, a6, 8e,
97, c7, d6, be, 44, 08, 14, 74, a6, 8e, 9a, ca, d3, bb, 45, 09, 15, 75, a3, 8b,
9a, ca, d3, bb, 45, 09, 15, 75, a3, 8b, 97, c7, d6, be, 44, 08, 14, 74, a6, 8e,
97, c7, d6, be, 44, 08, 14, 74, a6, 8e, 4f, 37, 5b, af, 69, 21, 2d, 81, f9, e1,
4f, 37, 5b, af, 69, 21, 2d, 81, f9, e1, 52, 3a, 5e, b2, 68, 20, 2c, 80, fb, e3,
52, 3a, 5e, b2, 68, 20, 2c, 80, fb, e3, 4f, 37, 5b, af, 69, 21, 2d, 81, fa, e2,
4f, 37, 5b, af, 69, 21, 2d, 81, fa, e2, 52, 3a, 5e, b2, 68, 20, 2c, 80, fc, e4,
52, 3a, 5e, b2, 68, 20, 2c, 80, fc, e4, 43, 07, 13, 73, a5, 8d, 99, c9, d4, bc,
43, 07, 13, 73, a5, 8d, 99, c9, d4, bc, 46, 0a, 16, 76, a4, 8c, 98, c8, d5, bd,
46, 0a, 16, 76, a4, 8c, 98, c8, d5, bd, 43, 07, 13, 73, a5, 8d, 99, c9, d4, bc,
43, 07, 13, 73, a5, 8d, 99, c9, d4, bc, 46, 09, 16, 76, a4, 8c, 98, c8, d5, bd,
46, 09, 16, 76, a4, 8c, 98, c8, d5, bd, 67, 1f, 2b, 7f, fd, e5, 50, 38, 5c, b0,
67, 1f, 2b, 7f, fd, e5, 50, 38, 5c, b0, 6a, 22, 2e, 82, f7, df, 51, 39, 5d, b1,
6a, 22, 2e, 82, f7, df, 51, 39, 5d, b1, 67, 1f, 2b, 7f, fe, e6, 50, 38, 5c, b0,
67, 1f, 2b, 7f, fe, e6, 50, 38, 5c, b0, 6a, 22, 2e, 82, f8, e0, 51, 39, 5d, b1,
6a, 22, 2e, 82, f8, e0, 51, 39, 5d, b1, a3, 8b, 97, c7, d6, be, 44, 08, 14, 74}

Example 1

Pixel run 1150 is a run of 16 contiguous pixels (pixel 0 to pixel 15) to be dithered by the halftone engine and that can be received as a single input for concurrent processing. Pixel 0 of pixel run 1150 is at location (0, 4) on the page 1100. Pixel run 1150 contains three pixel spans, one from each of the regions 1170, 1110 and 1120 (background is not regarded as a region for present purposes). In the pixel run: a span from pixels 2 to 4 requires halftoning using the RESOLUTION set of dithering matrices corresponding to a first content type; a span from pixels 6 to 8 requires the GRADATION dither matrix set corresponding to a second content type; a span from pixels 11 to 15 also requires the RESOLUTION set, as such relates to the first content type; and the rest are white background pixels. In the K colour space, white background pixels are of value 0x00. White background pixels can be dithered with any set of matrices and the result will always be 0x00. For this reason white background pixels can be ignored and be treated as a special kind of pixel span that can be merged with any other type of pixel.

To dither the pixel run 1150, it is more efficient to use the method described in first implementation, being FIG. 5. In this way the pixel run 1150 only needs to be dithered once using the process 500 described in FIG. 5, despite having 3 separate spans of pixels requiring 2 different sets of dithering matrices.

Method 500 begins with the pixel values of the pixel run 1150 supplied as input to the halftone engine as follows:

Pixel value={0x00, 00, 66, 66, 66, 00, 88, 88, 88, 00, 00, 66, 66, 66, 66, 66}

The pixel run 1150 is already in single colour channel format so procedure 900 is skipped for this example input. The attribute value of the pixel run 1150 is also input to the halftone engine as follows:

Attribute value={B, B, R, R, R, B, G, G, G, B, B, R, R, R, R, R} where B indicates a white background pixel, R indicates that this pixel requires the RESOLUTION set of dithering matrices, and G indicates that this pixel requires the GRADATION set of dithering matrices.

Figure 12A:
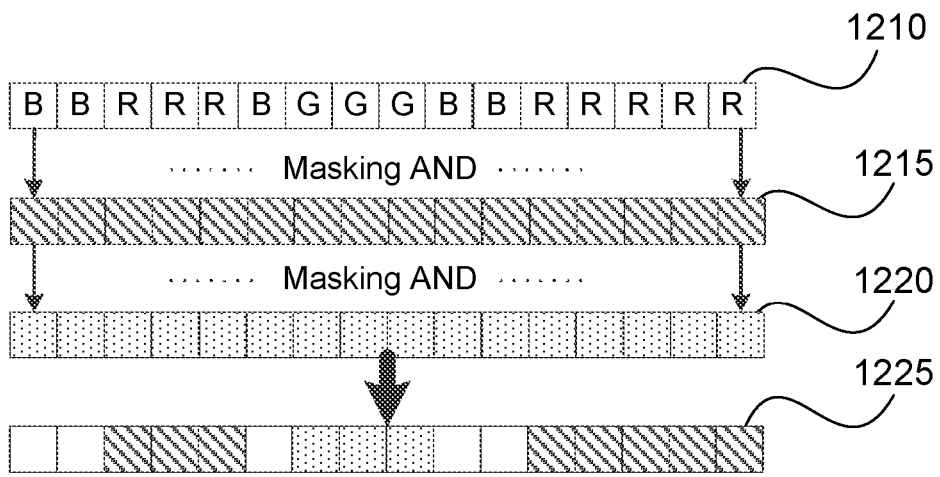
FIGS. 12a to 12f show respective operations for first example for the halftoning of the pixel run 1150 of FIG. 11.

At step 510, the values of line 5 from the first pass dithering matrix dm1 of the RESOLUTION set and GRADATION set for the pixel run starting from (0, 4) are combined or merged into mask1 as shown below, because the corresponding pixel run is the 5$^{th}$ scanline, using the instruction described in FIG. 6. FIG. 12a illustrates the input and output of this operation, being:

Input:
1210: Attribute value as mask =
{ B, B, R, R, R, B, G, G, G, B, B, R, R, R, R, R}
1215: RESOLUTION set line 5 dm1 =

```
{0x3a, 8a, 6b, bc, 3b, 8c, 6a, b9, e9, 52, 09, 23, eb, 53, 09, 22}
1220:   GRADATION set line 5 dm1 =
{0x2f, a3, df, 67, 0a, 30, a5, e1, 69, 0b, 2f, a3, df, 67, 0a, 30}
Output:
1225:   mask1 = {0x00, 00, 6b, bc, 3b, 00, a5, e1, 69, 00,
00, 23, eb, 53, 09, 22}
```

Figure 12B:
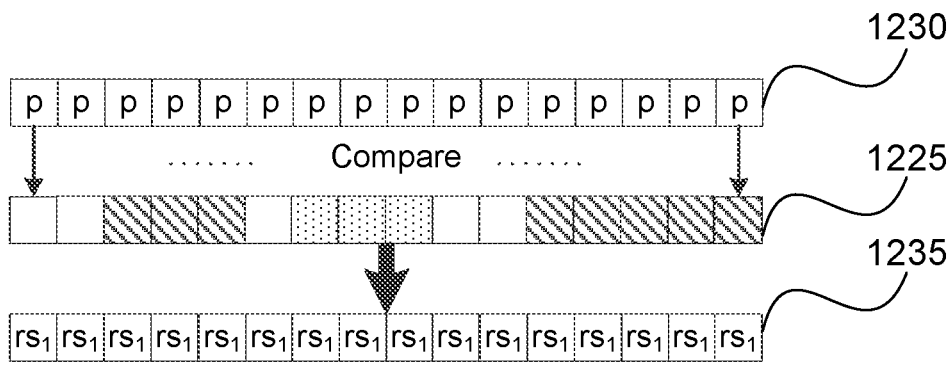

In this example the dither matrix value for background pixels are set as 0x00. It can also be set as the same value for either the RESOLUTION set or the GRADATION set of dithering matrices. As explained in the previous paragraph, in the K colour space, the value of the white background pixels are always 0x00. Hence they can be dithered with any set of matrices and the result will still be 0x00. At step 520, the pixel value of the pixel run 1150 is compared with mask1 using the SSE compare instruction as described in FIG. 7. FIG. 12*b* illustrates the input and output of this operation, being:

```
Input:
1230:   Pixel value =    {0x00, 00, 66, 66, 66, 00, 88, 88, 88, 00, 00,
66, 66, 66, 66, 66}
1225:   mask1 from step 510 = {0x00, 00, 6b, bc, 3b, 00, a5, e1, 69,
00, 00, 23, eb, 53, 09, 22}
Output:
1235:   rs1 =           {0x00, 00, 00, 00, FF, 00, 00,00, FF, 00,
00, FF, 00, FF, FF, FF}
``` where the value 0xFF indicates the pixel value is larger than the corresponding value in mask1, and the value 0x00 indicates the pixel value is smaller than or equals to the corresponding value in mask1.

Figure 12C:
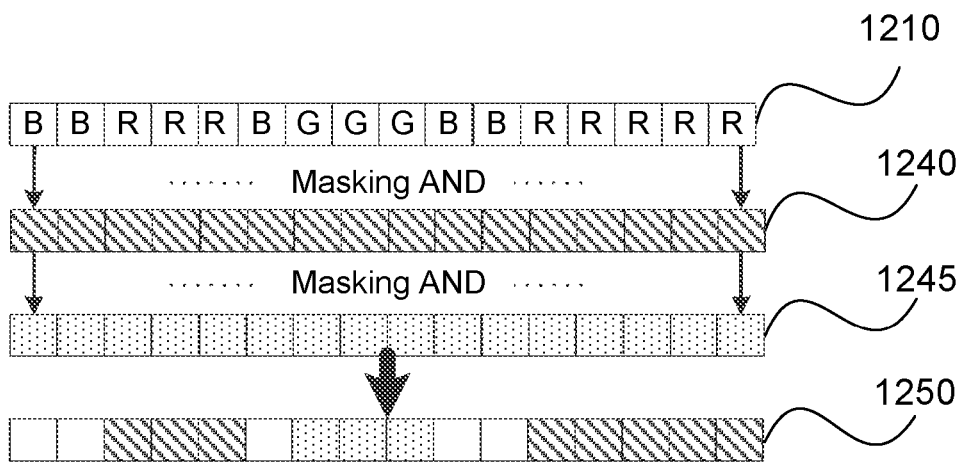

At step 530, the dm0 values of the RESOLUTION set and the GRADATION set for the pixel run starting from (0, 4) are merged into mdm0 as shown below, using the instruction described in FIG. 6. FIG. 12*c* illustrates the input and output of this operation, being:

```
Input:
1210:   Attribute value as mask =
{ B, B, R, R, R, B, G, G, G, B, B, R, R, R, R, R}
1240:   RESOLUTION set line 5 dm0 =
{0x32, 7c, 63, ac, 33, 7e, 62, a9, d9, 4a, 03, 1b, db, 4b, 02, 1a}
1245:   GRADATION set line 5 dm0 = {0x20, 8f, cb, 53, 02, 21,
91, cd, 55, 02, 20, 8f, cb, 53, 02, 21}
Output:
1250: mdm0 = {0x00, 00, 63, ac, 33, 00, 91, cd, 55, 00, 00, 1b, db, 4b,
02, 1a}
```

Figure 12D:
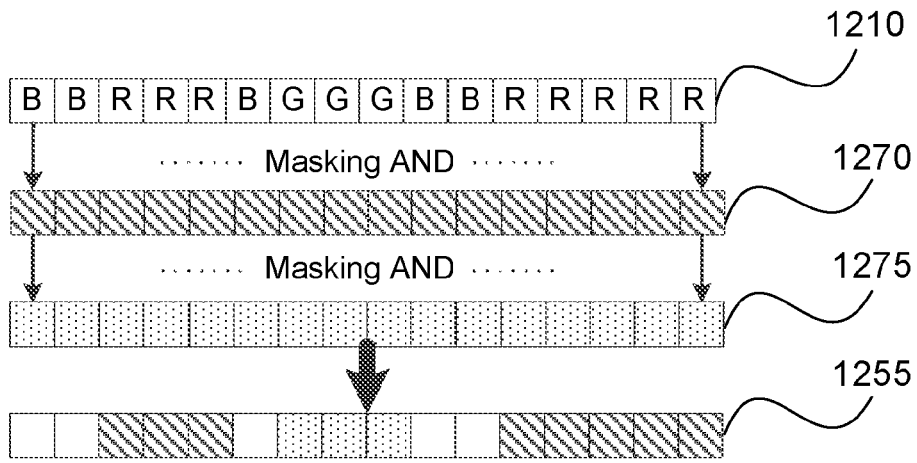

Similarly, at step 540, the dm2 values of the RESOLUTION set and the GRADATION set for the pixel run starting from (0, 4) are merged into mdm2 as shown below, using the instruction described in FIG. 6. FIG. 12*d* illustrates the input and output of this operation, being:

```
Input:
1210:   Attribute value as mask =
{ B, B, R, R, R, B, G, G, G, B, B, R, R, R, R, R}
1270:   RESOLUTION set line 5 dm2 = {0x42, 9a, 74, cc, 43, 9c, 72, c9,
f9, 5a, 11, 2b, fb, 5b, 11, 2a}
1275:   GRADATION set line 5 dm2 = {0x3f, b7, f3, 7b, 15, 41, b9, f5,
7d, 16, 3f, b7, f3, 7b, 15, 41}
Output:
1255:   mdm2 = {0x00, 00,74, cc, 43, 00, b9, f5, 7d, 00, 00, 2b, fb, 5b,
11, 2a }
```

Figure 12E:
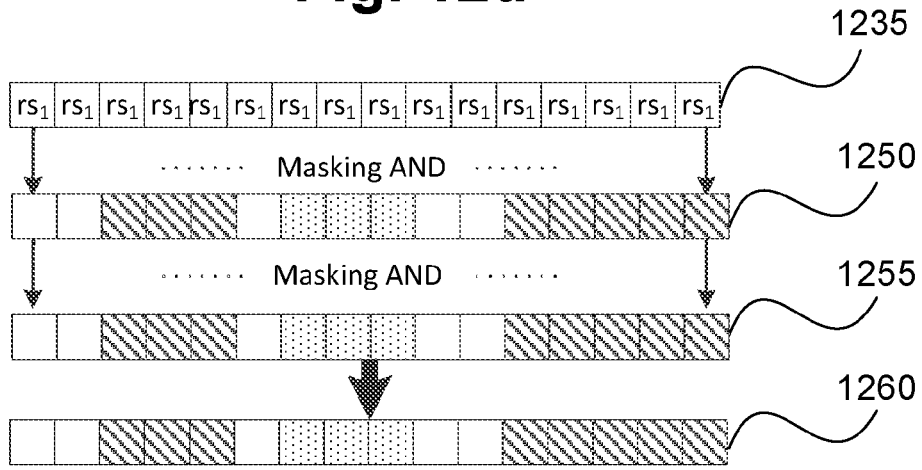

At step 550, the mdm0 values and mdm2 values from step 530 and 540 are combined or merged into mask2 using rs1 from step 520 as a mask. This represents a form of a combined data structure. FIG. 12*e* illustrates the input and output of this operation, being:

```
Input:
1235:   rs1 = {0x00, 00, 00,00, FF, 00, 00,00, FF, 00, 00, FF, 00, FF,
FF, FF}
1250:   mdm0 from step 530 = {0x00, 00, 63, ac, 33, 00, 91, cd, 55, 00,
00, 1b, db, 4b, 02, 1a}
1255:   mdm2 from step 540= {0x00, 00, 74, cc, 43, 00, b9, f5, 7d, 00,
00, 2b, fb, 5b, 11, 2a}
Output:
1260:   mask2 = {0x00, 00, 63, ac, 43, 00, 91, cd, 7d, 00, 00, 2b,
db, 5b, 11, 2a}
```

Using rs1 as mask means if rs1=0x00, the corresponding value of mask2=mdm0. Otherwise if rs1=0xFF, the corresponding value of mask2=mdm2.

Figure 12F:
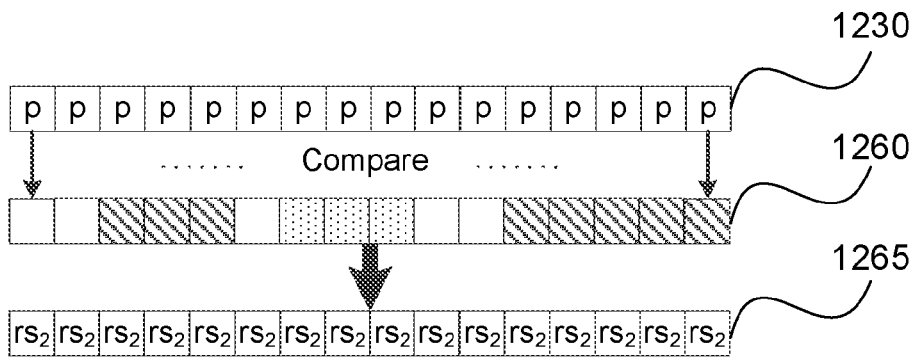

At step 560, the pixel value of the pixel run 1150 is compared with mask1 using the SSE compare instruction as described in FIG. 7. FIG. 12*f* illustrates the input and output of this operation, being:

```
Input:
1230:   Pixel value = {0x00, 00, 66, 66, 66, 00, 88, 88, 88, 00, 00, 66, 66,
66, 66, 66}
1260:   mask2 from step 550 = {0x00, 00, 63, ac, 43, 00, 91, cd, 7d, 00,
00, 2b, db, 5b, 11, 2a}
Output:
1265:   rs2 = {0x00, 00, FF, 00, FF, 00, 00, 00, FF, 00, 00, FF, 00,
FF, FF, FF}
```

In step 565 and procedure 1000, the final result is generated from rs1 and rs2 and then packed so that the high bit of each pixel comes from rs1, and the low bit of each pixel comes from rs2.

```
Input:
rs1 from step 520 =
{0x00, 00, 00, 00, FF, 00, 00, 00, FF, 00, 00, FF, 00, FF, FF, FF}
rs2 from step 560 =
{0x00, 00, FF, 00, FF, 00, 00, 00, FF, 00, 00, FF, 00, FF, FF, FF}
Output: (binary representation) 0000 0100 1100 0000 1100 0011
0011 1111
```

There is only one colour channel in this example, so step 570 is finished after one iteration of the loop. At the completion of method 500, the halftoned result 0x0440 C33F is output to the printer engine 110 for hard copy reproduction.

Example 2

Returning to FIG. 11, pixel run 1160 is a run of 16 contiguous pixels to be dithered by the halftone engine that can be received as a single input for concurrent processing. Pixel 0 of pixel run 1160 is at location (0, 8) on the page 1100. Pixel run 1160 contains four pixel spans from regions 1170, 1110, 1130 and 1140, in which: pixels 0 to 2 form a span and require the RESOLUTION set of dithering matrices corresponding to a first content type; pixels 6 to 8 form another span and require the GRADATION set corresponding to a second content type; pixels 10 to 11 form yet another span and require the HIGH_RESOLUTION set corresponding to a third content type; pixels 14 to 15 form a further span and require the TONE set corresponding to a fourth content type; and the remainder of the pixels are white background pixels. As explained before, the background pixels can be treated as a special kind of pixel span or content type that can be merged with any other type of pixels.

To dither the pixel run 1160, it is more efficient to use the method described in the second implementation of FIG. 8, because it needs four different sets of dithering matrices. Using method 500 of the first implementation will greatly increase the number of merging actions at steps 510, 530 and 540. Depending on the dithering setting, the difference between these two approaches is greater when the dithering results contains a multi-bit output of 4 bits per colour channel, meaning each set of dithering matrices contains 16 dithering matrices, m0 to m15.

To dither the pixel run 1160 using the procedure 800 described in FIG. 8, the steps are described below.

As input to procedure 800, the pixel values of the pixel run 1150 are provided to the halftone engine as follows:

Pixel value={0x66, 66, 66, 00, 00, 00, 88, 88, 88, 00, AA, AA, 00, 00, 77, 77}

The pixel values are already in single colour channel format so procedure 900 is skipped for this example input. The attribute values of the pixel run 1160 are also supplied as input to the halftone engine as follows:

Attribute value={R, R, R, B, B, B, G, G, G, B, H, H, B, B, T, T} where B indicates white background pixel, R indicates that this pixel requires the RESOLUTION set of dithering matrices, G indicates that this pixel requires the GRADATION set of dithering matrices, H indicates that this pixel requires the HIGH_RESOLUTION set of dithering matrices, and T indicates that this pixel requires the TONE set of dithering matrices.

At step 810, the dm1 values of the RESOLUTION set for the pixel run starting from (0, 8) is loaded into the SSE register:

dm1 at line 9={0x07, 20, e5, 50, 06, 1e, e2, 4e, 07, 20, e6, 50, 06, 1e, e1, 4e}

At step 820, the pixel values of the pixel run 1160 are compared with dm1 using the SSE compare instruction as described in FIG. 7. The result rs1 is:

rs1={0xFF, FF, 00, 00, 00, 00, 00, 00, FF, 00, 00, FF, 00, 00, 00, FF} where the value 0xFF indicates the pixel value is larger than the corresponding value in dm1, and the value 0x00 indicates the pixel value is smaller than or equals to the corresponding value in dm1.

At step 830 and step 840, the dm0 & dm2 values of the RESOLUTION set for the pixel run starting from (0, 8) are loaded and merged into mdm as shown below, using the instruction described in FIG. 6, being:

Input:
rs1 as mask =
{0xFF, FF, 00, 00, 00, 00, 00, 00, FF, 00, 00, FF, 00, 00, 00, FF}
dm0 at line 9 =
{0x00, 18, d5, 48, 00, 16, d2, 46, 00, 18, d6, 48, 00, 15, d1, 46}
dm2 at line 9 =
{0x0e, 28, f5, 58, 0d, 26, f2, 56, 0e, 28, f6, 58, 0c, 26, f1, 56}
Output:
mdm =
{0x0e, 28, d5, 00, 00, 00, d2, 46, 28, 00, d6, 58, 00, 00, d1, 56}

Using rs1 as mask means if rs1=0x00, the corresponding value of mdm=dm0. Otherwise if rs1=0xFF, the corresponding value of mdm=dm2.

At step 850, the pixel values of the pixel run 1160 are compared with mdm using the SSE compare instruction as described in FIG. 7. The result rs2 is:

rs2={0xFF, FF, 00, 00, 00, 00, 00, FF, FF, 00, 00, FF, 00, 00, 00, FF}

At step 860, steps 810 to 850 are repeated using dithering matrix sets GRADATION, HIGH_RESOLUTION, and TONE in turn. The resulting rs1 and rs2 are:

GRADATION result:
rs1 =
{0x00, 00, 00, 00, 00, 00, 00, 00, FF, 00, 00, 00, 00, 00, FF, 00}
rs2 =
{0x00, 00, FF, 00, 00, 00, 00, FF, FF, 00, 00, 00, 00, 00, FF, 00}
HIGH_RESOLUTION result:
rs1 =
{0x00, FF, 00, 00, 00, 00, FF, 00, FF, 00, FF, FF, 00, 00, 00, FF}
rs2 =
{0xFF, FF, 00, 00, 00, 00, FF, 00, FF, 00, FF, FF, 00, 00, 00, 00}
TONE result:
rs1 =
{0xFF, FF, FF, 00, 00, 00, FF, FF, 00, 00, FF, FF, 00, 00, FF, FF}
rs2 =
{0xFF, FF, FF, 00, 00, 00, FF, FF, 00, 00, FF, FF, 00, 00, FF, FF}

At step 870, all four results for rs1 generated using the four different sets of dithering matrices are merged together using the attribute data of the pixel run as a mask, using the SIMD merging operation described in FIG. 6, two at a time. The result is:

Input:
Attribute as mask = {R, R, R, B, B, B, G, G, G, B, H, H, B, B, T, T}
RESOLUTION rs1 =
{0xFF, FF, 00, 00, 00, 00, FF, 00, FF, 00, 00, FF, 00, 00, 00, FF}
GRADATION rs1 =
{0x00, 00, 00, 00, 00, 00, 00, 00, FF, 00, 00, 00, 00, 00, FF, 00}
HIGH_RESOLUTION rs1 =
{0x00, FF, 00, 00, 00, 00, FF, 00, FF, 00, FF, FF, 00, 00, 00, FF}
TONE rs1 =
{0xFF, FF, FF, 00, 00, 00, FF, FF, 00, 00, FF, FF, 00, 00, FF, FF}
Output:
rs1' =
{0xFF, FF, 00, 00, 00, 00, 00, 00, FF, 00, FF, FF, 00, 00, FF, FF}

Similarly, all four results for rs1 generated using the four different sets of dithering matrices are merged together as rs2':

Input:
Attribute as mask =
{R, R, R, B, B, B, G, G, G, B, H, H, B, B, T, T}
RESOLUTION rs2 =
{0xFF, FF, 00, 00, 00, 00, FF, FF, 00, 00, FF, 00, 00, 00, FF}
GRADATION rs2 =
{0x00, 00, FF, 00, 00, 00, 00, FF, FF, 00, 00, 00, 00, 00, FF, 00}
HIGH_RESOLUTION rs2 =
{0xFF, FF, 00, 00, 00, 00, FF, 00, FF, 00, FF, FF, 00, 00, 00, 00}
TONE rs2 =
{0xFF, FF, FF, 00, 00, 00, FF, FF, 00, 00, FF, FF, 00, 00, FF, FF}
Output:
rs2' =
{0xFF, FF, 00, 00, 00, 00, 00, FF, FF, 00, FF, FF, 00, 00, FF, FF}

In step 875 and procedure 1000, the final result is generated and packed from rs1' and rs2', where the high bit of each pixel comes from rs1', and the low bit of each pixel comes from rs2':

```
Input:
rs1' = {0xFF, FF, 00, 00, 00, 00, 00, 00, FF, 00, FF, FF, 00, 00, FF, FF}
rs2' = {0xFF, FF, 00, 00, 00, 00, 00, FF, FF, 00, FF, FF, 00, 00, FF, FF}
Output: (binary representation) 1111 0000 0000 0001 1100 1111 0000
1111
```

There is only one colour channel in this example, so step 880 is finished after obtaining the result above. The result 0xF001 CF0F is output to the printer engine.

INDUSTRIAL APPLICABILITY

The arrangements described are applicable to the computer and data processing industries, and particularly for halftone printing in an SIMD processing environment. The SIMD processing may be performed in a source computer or server, or alternatively in the printer device, depending on the particular implementation. Further, the SIMD capability can be either (1) in the host and used by a corresponding software (printer) driver to do the dithering, or (2) in the target device, where the SIMD capability performs the dithering.

Two specific scenarios for using the arrangements presently disclosed include:

1. In a printer controller with SIMD capability. In this case, the printer will typically have sufficient computational ability to manage its own dithering; and 2. In a printer driver for relatively inexpensive printer, the driver will do the dithering and send halftoned data to the printer.

Other implementations may be conceived, for example where the driver would send dither matrices to the printer, which in turn performs the dithering using the matrices upon the received print data.

Without the arrangements presently disclosed, the length of such a pixel run is generally limited to a span, if output is to be correct. Using the presently disclosed arrangements, the length of a pixel run for printing can be increased to include any number of spans.

The foregoing describes only some embodiments of the present invention, and modifications and/or changes can be made thereto without departing from the scope and spirit of the invention, the embodiments being illustrative and not restrictive.

I claim:

1. A graphics processing method comprising:
  receiving a plurality of contiguous pixels, as a single input, comprising at least a first pixel span associated with a first content type and a second pixel span associated with a second content type;
  associating at least one dithering matrix with each of the pixel spans based on a corresponding content type, so that the first and the second pixel spans are associated with different dithering matrices; and
  processing the single input of the received plurality of pixels using an SIMD (Single Instruction Multiple Data) type processor by referring to different dithering matrices depending on the content type of the corresponding pixel spans,
  wherein the different dithering matrices are combined into a combined data structure by selecting elements of the matrices depending on an arrangement of the pixel spans in the single input.

2. The method according to claim 1, wherein a pixel of the first pixel span and a pixel of the second pixel span are concurrently processed using elements of different dithering matrices depending on the content type of the corresponding pixel spans.

3. The method according to claim 1, wherein the content type is at least one of: image, text, and graphics.

4. A dithering method comprising:
  receiving, as a single input, a plurality of pixels comprising a first pixel span associated with a first content type and a second pixel span associated with a second content type;
  determining, for each pixel span, at least one associated dithering matrix based on a corresponding content type of the pixel span, so that the first and the second pixel spans are associated with different dithering matrices; and
  concurrently dithering the received plurality of pixels by executing a single SIMD (Single Instruction Multiple Data) instruction with respect to the received plurality of pixels, wherein dithering comprises processing, on an SIMD type processor, the first and second pixel spans using elements of different dithering matrices depending on the corresponding content type,
  wherein the different dithering matrices are combined into a combined data structure by selecting elements of the matrices depending on an arrangement of the pixel spans in the single input.

5. The method according to claim 4, further comprising:
  associating, for each span of a particular content type, at least two dithering matrices, each of the dithering matrices being used to produce a one bit of a multi-bit output for a received element.

6. The method according to claim 5, wherein the executing the single instruction further comprises, for each span of a particular content type, using the dithering matrix associated with the particular content type of the corresponding pixel span to produce a first bit of a multi-bit output, and using a further dithering matrix to produce a further bit of the multi-bit output, the further dithering matrix being selected based on the produced first bit and the content type of the corresponding pixel span.

7. The method according to claim 4, wherein the content type is at least one of: image, text, and graphics.

8. A dithering method comprising:
  receiving a pixel run having a plurality of pixels associated with a plurality of distinct content types, the pixel run comprising a plurality of pixel spans each associated with one of the content types;
  determining a dithering mode based on the plurality of distinct content types identified for the pixel spans within the received pixel run;
  associating, for each pixel span, at least one dithering matrix based on a corresponding content type; and
  concurrently dithering the received plurality of pixel spans in accordance with the determined dithering mode by executing an SIMD (Single Instruction Multiple Data) instruction on an SIMD type processor, the SIMD instruction operating concurrently on the plurality of pixel spans, taken as a single input, in accordance with different dithering matrices depending on the content type of the corresponding pixel span,
  wherein the different dithering matrices are combined depending on the determined dithering mode.

9. The method according to claim 8, wherein the determining of the dithering mode is further based on at least one of a length of the pixel run, a number of pixel spans in the run and a number of bits per pixel of dithered output.

10. The method according to claim 8, wherein the content type is at least one of: image, text, and graphics.

11. The method according to claim 8, wherein the combined dithering matrices are used by the single instruction.

12. The method according to claim 8, further comprising applying different dithering matrices to the pixel spans and combining results thereof to form a dithered pixel run.

13. The method according to claim 8, wherein the dithering mode is determined based on a number of distinct content types detected in the received plurality of elements, lengths of the pixel run and a number of bits per pixel in the multi-bit output.

14. The method according to claim 8, wherein a first dithering mode comprises:
combining the different dithering matrices into a combined data structure by selecting elements of the matrices depending on arrangement of the pixel runs; and
using the combined data structure to produce the output for the received plurality of elements.

15. The method according to claim 8, wherein a first dithering mode comprises:
concurrently merging elements of the different dithering matrices into a dithering mask by selecting elements from the different matrices depending on the content type of corresponding pixels in the pixel run; and
using the dithering mask to produce the output for the received plurality of pixels.

16. The method according to claim 8, wherein a second dithering mode comprises:
producing a single intermediate output for each detected content type using a corresponding dithering matrix; and
combining the intermediate outputs to produce an output for the received plurality of elements.

17. The method according to claim 8, wherein a second dithering mode comprises:
producing an intermediate output for each detected content type using a corresponding dithering matrix; and
concurrently merging the intermediate outputs by selecting pixels from different intermediate outputs depending on the content type of corresponding pixels in the pixel run to produce an output for the received plurality of pixels.

18. A non-transitory computer readable storage medium having a program recorded thereon, the program being executable by a processor to:
receive a plurality of contiguous pixels, as a single input, comprising at least a first pixel span associated with a first content type and a second pixel span associated with a second content type;
associate at least one dithering matrix with each of the pixel spans based on a corresponding content type, so that the first and the second pixel spans are associated with different dithering matrices; and
process the single input of the received plurality of pixels using an SIMD (Single Instruction Multiple Data) type processor by referring to different dithering matrices depending on the content type of the corresponding pixel spans,
wherein the different dithering matrices are combined into a combined data structure by selecting elements of the matrices depending on an arrangement of the pixel spans in the single input.

19. A non-transitory computer readable storage medium having a program recorded thereon, the program being executable by a processor to dither pixel data, the program comprising:
code for receiving a pixel run having a plurality of pixels associated with a plurality of distinct content types, the pixel run comprising a plurality of pixel spans each associated with one of the content types;
code for determining a dithering mode based on the plurality of distinct content types identified for the pixel spans within the received pixel run;
code for associating, for each pixel span, at least one dithering matrix based on a corresponding content type; and
code for concurrently dithering the received plurality of pixel spans in accordance with the determined dithering mode by executing an SIMD (Single Instruction Multiple Data) instruction on an SIMD type processor, the SIMD instruction operating concurrently on the plurality of pixel spans, taken as a single input, in accordance with different dithering matrices depending on the content type of the corresponding pixel span,
wherein the different dithering matrices are combined depending on the determined dithering mode.

20. A printer device comprising a memory, an SIMD (Single Instruction Multiple Data) processor and a program executable within the printer to:
receive a plurality of contiguous pixels, as a single input, comprising at least a first pixel span associated with a first content type and a second pixel span associated with a second content type;
associate at least one dithering matrix with each of the pixel spans based on a corresponding content type, so that the first and the second pixel spans are associated with different dithering matrices; and
process the single input of the received plurality of pixels using an SIMD type processor by referring to different dithering matrices depending on the content type of the corresponding pixel spans,
wherein the different dithering matrices are combined into a combined data structure by selecting elements of the matrices depending on an arrangement of the pixel spans in the single input.

21. A computerized apparatus comprising a memory, at least one processor coupled to the memory, the at least one processor comprising at least one SIMD (Single Instruction Multiple Data) type processor, and a program stored in the memory and executable by the at least one processor to:
receive a pixel run having a plurality of pixels associated with a plurality of distinct content types, the pixel run comprising a plurality of pixel spans each associated with one of the content types;
determine a dithering mode based on the plurality of distinct content types identified for the pixel spans within the received pixel run;
associate, for each pixel span, at least one dithering matrix based on a corresponding content type; and
concurrently dither the received plurality of pixel spans in accordance with the determined dithering mode by executing an SIMD instruction on the at least one SIMD type processor, the SIMD instruction operating concurrently on the plurality of pixel spans, taken as a single input, in accordance with different dithering matrices depending on the content type of the corresponding pixel span,
wherein the different dithering matrices are combined depending on an arrangement of the pixel spans in the single input.

* * * * *